United States Patent
Dockx et al.

(10) Patent No.: US 10,138,164 B2
(45) Date of Patent: Nov. 27, 2018

(54) SUPPLEMENTARY CEMENTITIOUS MATERIALS COMPRISING DREDGED SEDIMENTS

(71) Applicant: FLEMISH GOVERNMENT, DEPARTMENT OF PUBLIC WORKS, MARITIME ACCESS, Antwerp (BE)

(72) Inventors: Joris Dockx, Kapellen (BE); Jos Vandekeybus, Kalmthout (BE); Ruben Snellings, Leuven (BE); Liesbeth Horckmans, Boortmeerbeek (BE); Ozlem Cizer, Everberg (BE); Lucie Vanderwalle, Bonheiden (BE); Koen Van Balen, Leuven (BE)

(73) Assignee: FLEMISH GOVERNMENT, DEPARTMENT OF PUBLIC WORKS, MARITIME ACCESS, Antwerp (BE)

( * ) Notice: Subject to any disclaimer, the term of this patent is extended or adjusted under 35 U.S.C. 154(b) by 0 days.

(21) Appl. No.: 15/576,991

(22) PCT Filed: Mar. 18, 2016

(86) PCT No.: PCT/EP2016/055985
§ 371 (c)(1),
(2) Date: Nov. 27, 2017

(87) PCT Pub. No.: WO2016/198176
PCT Pub. Date: Dec. 15, 2016

(65) Prior Publication Data
US 2018/0162773 A1 Jun. 14, 2018

(30) Foreign Application Priority Data
Jun. 11, 2015 (EP) .................................. 15171642

(51) Int. Cl.
C04B 7/45 (2006.01)
C04B 14/36 (2006.01)
(Continued)

(52) U.S. Cl.
CPC .............. *C04B 14/361* (2013.01); *C04B 7/12* (2013.01); *C04B 18/0418* (2013.01);
(Continued)

(58) Field of Classification Search
USPC ................................ 106/745, 638, 713, 739
See application file for complete search history.

(56) References Cited

U.S. PATENT DOCUMENTS 4,737,191 A 4/1988 Meynardi
7,304,012 B2 * 12/2007 Green ..................... B01J 23/22
502/180

(Continued)

FOREIGN PATENT DOCUMENTS

DE 3150993 A1 6/1983
EP 2226363 A1 9/2010
(Continued)

OTHER PUBLICATIONS

Trumer et al., "Investigations into the application of calcined clays as composite material in cement" ZEMENT-KALK-GIPS-ZKG International, Bauverlag BV., Getersloh, DE, vol. 67, No. 9, Sep. 1, 2014 (Sep. 1, 2014), pp. 52-57, XP001593292.
(Continued)

*Primary Examiner* — James E McDonough
(74) *Attorney, Agent, or Firm* — Knobbe Martens Olson & Bear LLP

(57) ABSTRACT

A supplementary cementitious material used in combination with an activator such as Portland cement to produce a hydraulic binder. The supplementary cementitious material is based on physico-chemically treated filter cake product
(Continued)

extracted from dredged sediments and can partially replace Portland cement clinker in conventional concrete applications with positive effects on sustainability (reduction of $CO_2$ emissions, upcycling of residues).

11 Claims, 11 Drawing Sheets

(51) Int. Cl.
    *C04B 28/04* (2006.01)
    *C04B 7/12* (2006.01)
    *C04B 18/04* (2006.01)
    *C04B 20/00* (2006.01)
    *C04B 20/06* (2006.01)
    *C04B 7/00* (2006.01)
    *C04B 28/00* (2006.01)
    *C04B 32/00* (2006.01)

(52) U.S. Cl.
    CPC .......... *C04B 20/008* (2013.01); *C04B 20/061* (2013.01); *C04B 28/04* (2013.01); *Y02P 40/145* (2015.11); *Y02W 30/91* (2015.05)

(56) References Cited

U.S. PATENT DOCUMENTS

| | | | |
|---|---|---|---|
| 7,553,423 B2 * | 6/2009 | Buddenberg | C02F 11/14 106/697 |
| 2006/0130707 A1 * | 6/2006 | Grasso, Jr. | C04B 14/22 106/697 |
| 2010/0186635 A1 * | 7/2010 | Wang | C04B 18/021 106/697 |
| 2011/0185950 A1 * | 8/2011 | Cassat | C04B 18/021 106/694 |
| 2014/0230696 A1 * | 8/2014 | Bullerjahn | C04B 28/04 106/606 |

FOREIGN PATENT DOCUMENTS

| | | |
|---|---|---|
| GB | 2316333 A | 2/1998 |
| WO | WO 98/28046 A1 | 7/1998 |

OTHER PUBLICATIONS

Search Report in International Application No. PCT/EP2016/055985, dated Jun. 17, 2016.

* cited by examiner

SUPPLEMENTARY CEMENTITIOUS MATERIALS COMPRISING DREDGED SEDIMENTS

RELATED APPLICATIONS

This application is the U.S. National Phase under 35 U.S.C. § 371 of International Application PCT/EP2016/055985, filed Mar. 18, 2016, designating the U.S., and published in English as WO 2016/198176 on Dec. 15, 2016, which claims priority to European Patent Application No. 15171642.0, filed Jun. 11, 2015, the entire contents of which are incorporated herein by reference.

FIELD OF THE INVENTION

Disclosed herein is a supplementary cementitious material to be used in combination with an activator such as Portland cement for producing hydraulic binders. The supplementary cementitious material is based on physico-chemically treated filter cake product extracted from dredged sediments and can partially replace Portland cement clinker in conventional concrete applications.

BACKGROUND

At present, concrete is the second-most used material by mankind behind water. The overwhelming success of concrete as a construction material is related to the widespread availability of its raw material components, to its relatively low cost and to its ease in application, being fluid and workable when freshly prepared and transforming into a hardened, competent rock-like material when cured.

Concrete is a composite mix of fine and coarse aggregates bound together by a cementitious binder. In the overwhelming majority of cases (>98%) the cementitious binder is based on Portland cement clinker interground with calcium sulfate. It is estimated that to date about 4 Gt/y of Portland clinker is being produced. Limestone and clay are the conventional clinker raw materials that are fired at 1450° C. to form the clinker. The firing process and the decomposition of limestone into CaO and $CO_2$ amount to a typical combined $CO_2$ emission of 0.8 t $CO_2$/t clinker. Considering the scale of production it is estimated that 5-8% of man-made $CO_2$ emissions are related to cement manufacture.

A common approach for lowering the environmental impact of cement production is the partial replacement of Portland clinker by supplementary cementitious materials (SCMs) in so-called blended cements. SCMs are usually low-cost by-products from other industries such as blast-furnace slags from steel production or fly ashes from coal combusted electricity production. Next to cutting industrial $CO_2$ emissions and energy consumption by clinker production this approach enables valorisation of large volumes of by-products and avoids landfilling of wastes. Based on globally averaged clinker replacement levels it is estimated that currently about 520 Mt/y of materials are used as SCMs in cement and concrete products. Since most conventional, high-quality SCMs such as blast-furnace slags are practically entirely consumed, further incremental reductions of the environmental impact of cement production will need to come from new, alternative materials. The current object of invention is claimed to be one of these.

Since the supply of conventional high-quality SCMs is limited and fully utilized, one approach to further increase clinker replacement levels is to produce alternative SCMs such as thermally activated clays. A commonly shared property of SCM blended cements is their slower strength development compared to Portland cements. This and the related lower heat release is beneficial to some applications such as mass concrete. However for the cement producer who aims to meet pre-set strength requirements, slow strength development is a factor limiting the maximal clinker replacement level. In this respect, the key quality parameters for SCMs are reactivity and contribution to strength development. One way of enhancing the reactivity of potential SCMs of interest is thermal activation. Prior art learns that thermal treatments are mostly targeted at natural clays. Thermal activation of clays at temperatures between 550 and 800° C. can result in reactive SCMs that show acceptable early strength development at relatively high replacement levels of 20-40 wt. % of the binder (e.g. U.S. Pat. No. 5,788,762). However, the performance of the calcined clay SCMs was found to be uneven and to depend on (phase) composition. Calcination, and more specifically dehydroxylation, of clay minerals produces an amorphous material that can be very reactive as supplementary cementitious material. Metakaolin, produced by calcination of kaolins is known to be the preferred and most reactive among the activated clay minerals (He, C., Makovicky, E. and Osbaeck, B., 'Thermal stability and pozzolanic activity of calcined kaolin', Appl. Clay Sc. 9 (1994) 165-187.). Reactive SCMs can also be produced by calcining kaolinite containing residues from oil sand processing (at least 40 wt. % kaolinite) as described in GB2316333A. Other clay minerals may be variable in reactivity. Smectite clay minerals show considerable pozzolanic activity when properly calcined. In contrast, other common clay minerals such as illite and chlorite were shown to have little reactivity towards hydrated cement when calcined (Fernandez, R., Martirena, F. and Scrivener, K., 'The origin of the pozzolanic activity of calcined clay minerals: a comparison between kaolinite, illite and montmorillonite', Cement Concrete Res. 41 (2011) 113-122; Snellings, R., Mertens, G. and Elsen, J., 'Supplementary cementitious materials', Rev. Mineral. Geochem. 74 (2012) 211-278; Trumer, A., Ludwig, H.-M., 'Investigations into the application of calcined clays as composite material in cement' Zement-Kalk-Gips International 67 (2014) 52-57). Hence, the use of clays comprising mainly illite and chlorite was previously regarded as being unsuitable as SCM. A later invention describes cementitious binders existing of Portland clinker blended with a calcined clay and carbonate material (EP2253600A1). The beneficial "synergetic" effect on strength development was obtained for clays containing clay minerals belonging to the kaolin and smectite groups. In this case the thermal activation process should avoid a chemical reaction between the clay and carbonate materials.

In another patent (U.S. Pat. No. 4,737,191) a process is described to produce a hydraulic binder by the reaction of clay phases and calcium carbonate at temperatures of 700-900° C. An increased $CO_2$ partial pressure is maintained to avoid the formation of free lime (CaO). Yet another patent application (WO98/28046) describes a thermo-chemical treatment of contaminated sediments consisting of a mixing with additives such as calcium oxides and heat treatment at elevated temperatures of 1150-1500° C. In this process an entirely molten slag is produced that can be used as supplementary cementitious material. Thus, the state-of-the-art describes the production of SCMs by thermal activation of clay materials. The presence of kaolinite and smectite group clay minerals in the original clay is desirable. Other clay minerals are perceived to be less suitable, even when calcined. Since kaolinite and smectite group clay minerals are less common in non-tropical regions, there is a need for alternatives in more temperate regions such as North and Western Europe.

SUMMARY OF THE INVENTION

The present invention relates to the unexpected finding that physico-chemically upgraded and calcined filter cake products from dredging sediments present a reactivity and contribution to strength suitable to enable their use as SCM. Since the invented product is obtained through a closely controlled physico-chemical extraction and activation process in which the properties of the filter cake is intentionally changed, the invented product is to be considered as a processed product, not as a natural material or clay.

Aspect 1. In a first aspect, the present invention comprises a supplementary cementitious material (SCM) for use as cement replacement in concrete manufacture, characterized in that it comprises the fine fraction of dredged sediments.

The fine fraction of dredged sediments may have a beneficial effect on the strength of concrete products which extends beyond a mere filler effect, i.e. effects of dilution when the cement content is reduced or effects related to additional water and surface area caused by the replacement of Portland cement by fine powders. Also, this may be an effective way of recycling the fine fraction of dredged sediments.

The term "supplementary cementitious material" (SCM) as used herein refers to a material added to Portland cement or to cement clinker that reacts with cement hydrates in the presence of water to produce additional cementitious hydrate reaction products.

The term "fine fraction" e.g. of dredged sediments as used herein refers to a granular substance having a particle size predominantly smaller than 63 µm (=particle size cut-off), i.e. the fine fraction comprises less than 30 wt. %, preferably less than 10 wt. % grains having a grain size larger than 63 µm, wherein the particle size distribution is measured by means of sedimentation analysis. The term "grain size" as used herein may be equivalently worded as a "particle size". Accordingly, the term "fine fraction" e.g. of dredged sediments as used herein refers to a granular substance having a particle size predominantly smaller than 63 µm (=particle size cut-off), i.e. the fine fraction comprises less than 30 wt. %, preferably less than 10 wt. % grains having a grain size larger than 63 µm, wherein the particle size distribution is measured by means of sedimentation analysis.

The term "coarse fraction" as used herein refers to a granular substance having a grain size predominantly larger than about 63 µm, i.e. the coarse fraction comprises less than 30 wt. %, preferably less than 10 wt. % grains having a grain size smaller than 63 µm. The grain size cut-off of about 63 µm can vary based on the process used to separate the fine fraction from the coarse fraction of the dredged sediment and can range from 40 µm to 100 µm, preferably between 40 and 80 µm, most preferably between 60 and 65 µm, such as at about 63 µm.

Aspect 2. In a further aspect, the present invention comprises the SCM according to aspect 1 characterized in that the fine fraction of dredged sediments is heat treated, the heat treatment involving calcination.

Calcination is a process involving the dehydroxylation of the fine fraction of dredged sediments. Accordingly, aspect 2 can be equivalently worded as follows: In a further aspect, the present invention comprises the SCM according to aspect 1 characterized in that the fine fraction of dredged sediments is heat treated, the heat treatment involving dehydroxylation.

Heat treatment, especially calcination, may enhance the pozzolanic activity of dredged sediments.

The heat treatment may comprise flash calcination using short residence times (0.1-10 s) and maximum temperatures of 800-1100° C. The flash calcination process used can be any type of flash calcination process known in the art. As a non-limiting example, reference is given to the technology used by FLSmidth (DK) as e.g. described in patent application WO2014085538. The temperature range of 800-1100° C. is a range given in material temperatures, i.e. it refers to the average temperature reached by the calcined material during flash calcination. Throughout the text, flash calcination temperatures provided herein are given as material temperatures, unless specified otherwise. Material temperatures are distinct from flame temperatures. Flame temperature is the temperature reached by a flash calciner's flame during flash calcination.

Alternatively, the heat treatment may comprise calcination in a rotary kiln using residence times of 20 min to 3 h and a maximum temperature between 550-800° C., preferably 650-750° C.

Furthermore, the heat treatment may also comprise calcination in a stationary kiln using residence times of 20 min to 3 h and a maximum temperature between 550-800° C., preferably 650-750° C.

Without limitation of the invention to any particular theory of operation, it is thought that combinations of the shortest heat treatment times and the lowest heat treatment temperatures correspond to minimal thermal budgets required for removing hydroxyl groups from clay minerals comprised in the dredged sludge. Hydroxyl group removal can enhance the SCM's pozzolanic activity.

Also, it is thought that combinations of the longest heat treatment times and the highest heat treatment temperatures correspond to the highest thermal budgets which are acceptable such that no or only limited high temperature phases are formed during heat treatment. The presence of high temperature phases such a spinel and cristobalite, formed by recrystallization of clay minerals, may adversely affect an SCM's pozzolanic activity.

Aspect 3. In a further aspect, the present invention comprises the SCM according to aspects 1 or 2 characterized in that the fine fraction of dredged sediments comprises 20 to 40 wt. % (dry matter based—DM, i.e. based on total mass of the dredged sediments excluding physically absorbed water) illite, 0 to 10 wt. % DM chlorite, 0 to 10 wt. % DM glauconite, 0 to 10 wt. % DM kaolinite, 0 to 10 wt. % DM smectite, 0.0 to 0.10 wt. % DM chlorides, and less than 5.0 wt. % DM organic carbon.

Alternatively, aspect 3 may provide an SCM according to aspects 1 or 2 characterized in that the fine fraction of the dredged sediments comprises 20 to 40 wt. % (dry matter based—DM, i.e. based on total mass of the dredged sediments excluding physically absorbed water) illite, 0 to 10 wt. % DM chlorite, 0 to 10 wt. % DM glauconite, 0 to 10 wt. % DM kaolinite, 0 to 10 wt. % DM smectite, 0.0 to 0.20 wt. % DM chlorides, and less than 5.0 wt. % DM organic carbon.

For SCMs arising from dredged sludge originating from salty or brackish water, which may contain chlorides, chlorides are preferably removed from the dredged sludge during dewatering.

Dredged sediments comprising these minerals may be advantageously processed into SCMs by means of the method according to any one of aspects 13 to 15 of the present invention.

Aspect 4. In a further aspect, the present invention comprises the SCM according to any one of aspects 1 to 3 characterized in that it is obtainable by means of the following steps:
a) providing dredged sludge comprising at least 50 to at most 90 wt. % water, at least 0 to at most 60 wt. % DM coarse fraction (>63 μm), and at least 40 wt. % DM fine fraction, said fine fraction preferably comprising at least 40 wt. % DM (+/−15%) hydrous aluminosilicates;
b) removing the coarse fraction from the dredged sludge, thereby retaining the fine fraction of the dredged sludge;
c) adding of portlandite ($Ca(OH)_2$) or quicklime ($CaO$) to the fine fraction;
d) dewatering of the fine fraction, thereby forming dried filter cake precursor; and,
e) thermally treating the dried filter cake precursor.

This may yield SCMs which might advantageously partly replace Portland cement clinker for e.g. concrete manufacture.

Preferably, chlorides are removed from the dredged sediments during the dewatering of the dredging sludge. Preferably, chlorides are sufficiently removed from the dredged sediments such that the total, acid-soluble amount of chloride remaining in the processed SCM is less than 0.10 wt. %. When the SCM is used in combination with a cement having a low chloride content, the SCM's low chloride content enables meeting the prescribed chloride limits for prestressed and reinforced concrete of 0.06-0.1 wt. % DM acid-soluble chloride based on total binder (cement+SCM). When chloride concentrations are higher than the prescribed chloride limits, steel reinforcements may corrode and the reinforced concrete may fail. When chlorides are present in concentrations higher than 0.10 wt. % DM, the resulting blended cement may still be used in plain concrete as no limits on the chloride concentration are in place for plain concrete.

The chloride concentrations as reported herein are measured by means of titration or anion chromatography on acid-based extractions.

The dredged sediments may comprise organic carbon, for example 4.0-6.0 wt. % DM organic carbon. The organic carbon is preferably removed during thermal treatment of the dried filter cake precursors.

Aspect 5. In a further aspect, the present invention comprises the supplementary cementitious material according to aspect 4 characterized in that the dried filter cake precursor comprises at least 40 to at most 99 wt. % DM hydrous aluminosilicates and at least 1 to at most 15 wt. % DM calcium (alumino-)silicate hydrates; wherein the calcium aluminosilicate hydrates are products of the pozzolanic reaction between $Ca(OH)_2$ and the fine fraction of the dredged sludge.

Aspect 6. In a further aspect, the present invention comprises the supplementary cementitious material according to any of aspects 4 or 5 characterized in that portlandite (slaked lime, $Ca(OH)_2$), is added to the fine fraction of the dredged sediments in a quantity of 2 to 10 wt. % DM, or in that quicklime ($CaO$) is added in a quantity of 2 to 7 wt. % DM.

Aspect 7. In a further aspect, the present invention comprises the supplementary cementitious material according to any one of aspects 4 to 6 characterized in that step d) involves mechanically dewatering of the fine fraction. Mechanical dewatering may comprise the use of membrane filter presses, belt presses, and/or centrifuges.

Aspect 8. In a further aspect, the present invention comprises the supplementary cementitious material according to any one of aspects 4 to 7 characterized in that the dewatered fine fraction comprises less than 60 wt. % physisorbed water, preferably less than 50 wt. %, such as less than 40 wt. % physisorbed water.

The amount of physisorbed water is measured by: first weighing the dewatered fine fraction (which comprises physisorbed water), subsequently heating the dewatered fine fraction to 40° C., maintaining the dewatered fine fraction at that temperature while the dewatered fine fraction is exposed to the ambient atmosphere such that physisorbed water gradually evaporates, and subsequently weighing the dewatered fine fraction again once a constant weight is reached. One minus the ratio of the latter weight and the former weight yields the amount of physisorbed water.

Aspect 9. In a further aspect, the present invention comprises the supplementary cementitious material according to any one of aspects 4 to 8 characterized in that step e) involves flash-calcination of the dried filter cake precursor for at least 0.10 s to at most 10 s at a temperature of at least 800° C. to at most 1100° C.

Aspect 10. In a further aspect, the present invention comprises the supplementary cementitious material according to any one of aspects 4 to 8 characterized in that step e) involves heating the dried filter cake precursor in a rotary kiln; to a temperature between at least 550° C. and at most 850° C., preferably between at least 650° C. and at most 750° C.; for at least 20 minutes to at most 3.0 hours.

Aspect 11. In a further aspect, the present invention comprises a hydraulic binder comprising Portland cement and a supplementary cementitious material according to any one of aspects 1 to 10; characterized in that the supplementary cementitious material is present in a concentration of 5-70 wt. %, preferably 10-50 wt. %, more preferably 20-40 wt. %, wherein the wt. % is based on the total weight of the hydraulic binder.

Aspect 12. In a further aspect, the present invention comprises the use of dredged sediments for the manufacture of supplementary cementitious materials according to any one of aspects 1 to 10.

Aspect 13. In a further aspect, the present invention comprises a method for producing a supplementary cementitious material according to any one of aspects 1 to 10 characterized in that it comprises the steps:
a) providing dredged sludge comprising at least 50 wt. % to at most 90 wt. % water, at least 0 to at most 60 wt. % DM coarse fraction (>63 μm) and at least 40 wt. % DM fine fraction;
b) removing the coarse fraction (>63 μm) from the dredged sludge, thereby retaining the fine fraction of the dredged sludge;
c) adding portlandite (slaked lime, $Ca(OH)_2$) or quicklime ($CaO$) to the fine fraction.
d) dewatering of the fine fraction, thereby forming dried filter cake precursor.

In step c), $Ca(OH)_2$ may be added directly as slaked lime, or indirectly as quicklime ($CaO$) in which case it will rapidly hydrate to form $Ca(OH)_2$.

This may yield a supplementary cementitious material which can partially replace Portland cement in hydraulic binders.

Aspect 14. In a further aspect, the present invention comprises the method according to aspect 13 characterized in that step d) is followed by the step:
e) thermally treating the dried filter cake precursor.

This may enhance the pozzolanic activity of the supplementary cementitious material obtained from the dried filter cake precursor.

The thermal treatment may involve flash calcination as described in aspect 9 of the present invention. Alternatively, the thermal treatment may involve the use of a rotary kiln as described in aspect 10 of the present invention.

Aspect 15. In a further aspect, the present invention comprises the method according to aspect 13 or 14 characterized in that the dried filter cake precursor comprises at least 40 to at most 99 wt. % DM hydrous aluminosilicates, and at least 1.0 to at most 15 wt. % DM amorphous calcium (alumino-)silicate hydrates.

In some embodiments of the method according to any one of aspects 13 to 15, the SCM can be further defined according to the subject matter of any one of aspects 1 to 10.

Aspect 16. In a further aspect, the present invention comprises a method for recycling the fine fraction of dredged sediments, the method comprising the steps:
providing dredged sediments comprising a fine fraction and a coarse fraction; and,
using the fine fraction of the dredged sediments for producing a supplementary cementitious material.

Preferably, the supplementary cementitious material is produced using a method according to any one of aspects 13 to 15.

Preferably, the fine fraction of dredged sediments is recycled into a supplementary cementitious material according to any one of aspects 1 to 10.

Aspect 17. Supplementary cementitious material (SCM) comprising up to 30% quartz ($SiO_2$), up to 15 wt. % feldspars (($Na,K$)$AlSi_3O_8$), up to 5% calcite ($CaCO_3$), up to 5% anhydrite ($CaSO_4$) and at least 30 wt. % amorphous phase.

Aspect 18. The SCM according to aspect 17 wherein the amorphous phase comprises $SiO_2$, $CaO$, $Al_2O_3$, $Fe_2O_3$, $MgO$, $K_2O$, $Na_2O$, and optionally $SO_3$.

Aspect 19. The SCM according to aspect 18 wherein the amorphous phase comprises 40-55 wt. % $SiO_2$, 10-20 wt. % $CaO$, 8-20 wt. % $Al_2O_3$ and 8-20 wt. % $Fe_2O_3$, wherein the amorphous phase contains at least 20% of glass particles having a median particle size of 20-30 μm; preferably wherein the glass particles comprise 10-20 wt. % $CaO$; preferably wherein the glass particles are rounded glass particles, more preferably wherein the glass particles are spherical glass particles.

Aspect 20. Method for producing a supplementary cementitious material (SCM) characterized in that it comprises the steps:
a) providing dredged sludge comprising at least 50 wt. % to at most 90 wt. % water, at least 0 to at most 60 wt. % dry matter-based (DM) coarse fraction, and at least 40 wt. % DM fine fraction;
b) removing the sand fraction from the dredged sludge, thereby retaining the fine fraction of the dredged sludge, the fine fraction comprises less than 30 wt. %, preferably less than 10 wt. % grains having a grain size larger than 63 μm;
c) adding of portlandite (slaked lime, $Ca(OH)_2$), or quicklime ($CaO$) to the fine fraction;
d) dewatering of the fine fraction, thereby forming dried filter cake precursor; and,
e) thermally treating the dried filter cake precursor.

Aspect 21. The method according to aspect 20 wherein step e) involves calcination of the dried filter cake precursor.

Aspect 22. The method according to aspect 20 or 21 wherein step e) involves flash calcination of the dried filter cake precursor.

Aspect 23. The method according to aspect 22 wherein flash calcination involves heating the dried filter cake precursor for at least 0.10 s to at most 10 s at a temperature of at least 800° C. to at most 1100° C.

Aspect 24. The method according to aspect 20 or 21 wherein step e) involves heating the dried filter cake precursor in a rotary kiln; to a temperature between at least 550° C. and at most 850° C., preferably between at least 650° C. and at most 750° C.; for at least 20 minutes to at most 3 hours.

Aspect 25. The method according to any one of aspects 20 to 21 wherein the dried filter cake precursor comprises at least 40 to at most 99 wt. % DM hydrous aluminosilicates and at least 1 to at most 15 wt. % DM calcium (alumino-)silicate hydrates; wherein the calcium (alumino-)silicate hydrates are products of the pozzolanic reaction between $Ca(OH)_2$ and the fine fraction of the dredged sludge.

Aspect 26. The method according to any one of aspects 20 to 25 wherein step c) involves adding a hydraulic binder comprising portlandite ($Ca(OH)_2$) to the fine fraction of the dredged sediments in a quantity of 2 to 10 wt. % DM, or wherein step c) involves adding a hydraulic binder comprising quicklime ($CaO$) in a quantity of 2 to 7 wt. % DM Aspect 27. The method according to any one of aspects 20 to 26 wherein the fine fraction comprises less than 60 wt. % physisorbed water.

Aspect 28. The method according to any one of aspects 20 to 27 wherein step d) involves mechanically dewatering the fine fraction.

Aspect 29. Use of the fine fraction of dredged sediments for the manufacture of a supplementary cementitious material (SCM), the fine fraction comprising less than 30 wt. %, preferably less than 10 wt. % grains having a grain size larger than 63 μm, wherein grain size is measured by means of sedimentation analysis.

Aspect 30. The use according to aspect 29 wherein the fine fraction of dredged sediments comprises at least 30 wt. % dry matter-based (DM) illite, 0 to 10 wt. % DM chlorite, 0 to 10 wt. % DM glauconite, 0 to 10 wt. % DM kaolinite, less than 5.0 wt. % DM organic carbon, and less than 0.2 wt. % DM chloride.

Aspect 31. Hydraulic binder comprising Portland cement and an SCM according to any one of claims 17 to 19, and/or an SCM obtained through a method according to any one of aspects 20 to 28; wherein the supplementary cementitious material is present in a concentration of 5-70 wt. %, preferably 10-40 wt. %, more preferably 20-40 wt. %.

BRIEF DESCRIPTION OF THE DRAWINGS

The following description of the figures of specific embodiments of the invention is merely exemplary in nature and is not intended to limit the present teachings, their application or uses. Throughout the drawings, corresponding reference numerals indicate like or corresponding parts and features.

Figure 1:
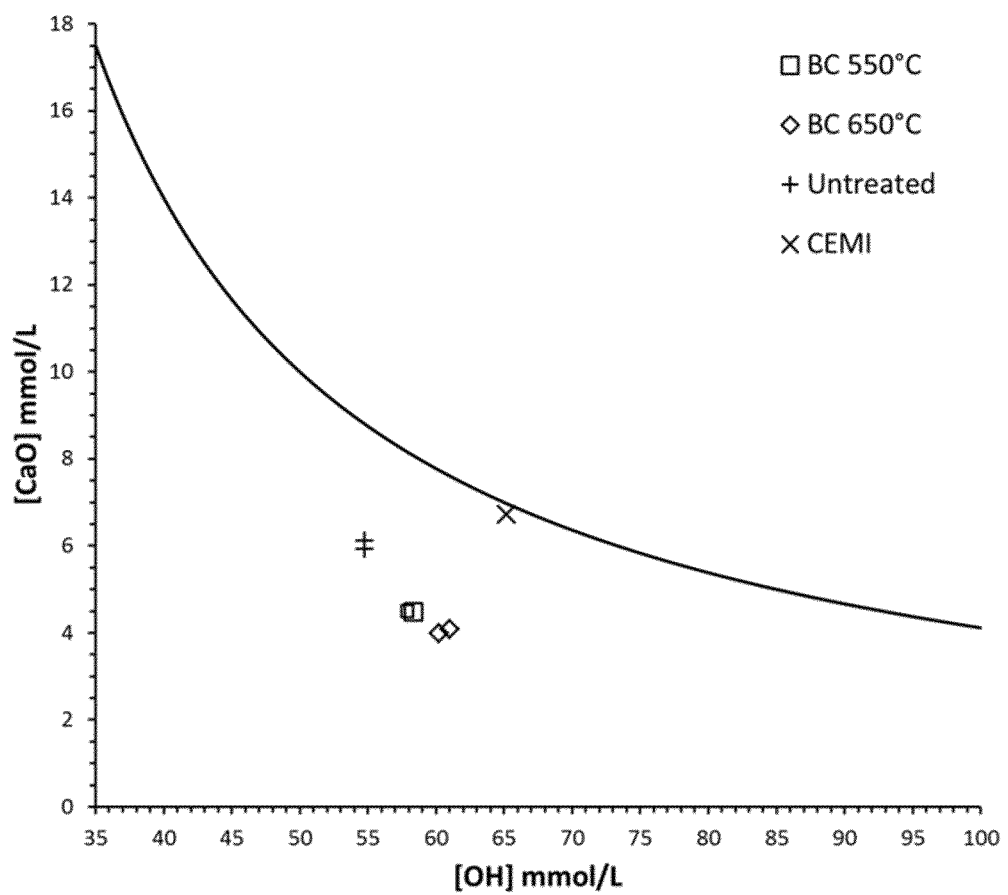
FIG. 1 shows EN 196-5 test results for blended cements containing batch calcined (BC) filter cakes.

Throughout the drawings, the following numbering and symbols are adhered to: underwater cells (1), sand separation unit (SSU) (2), pipeline (3), settling ponds (4), treatment installation (5), storage facility (7), XRD pattern of flash calcined filter cakes (41), XRD pattern of batch calcined filter cakes (42), XRD pattern of non-calcined filter cakes (43), illite (I), smectite (S), kaolinite (K), anhydrite (A, An), Quartz, (Q), and calcite (Cc),

DETAILED DESCRIPTION

The present invention will be described with respect to particular embodiments but the invention is not limited thereto but only by the claims. Any reference signs in the claims shall not be construed as limiting the scope thereof.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps. The terms "comprising", "comprises" and "comprised of" when referring to recited members, elements or method steps also include embodiments which "consist of" said recited members, elements or method steps.

Furthermore, the terms first, second, third and the like in the description and in the claims, are used for distinguishing between similar elements and not necessarily for describing a sequential or chronological order, unless specified. It is to be understood that the terms so used are interchangeable under appropriate circumstances and that the embodiments of the invention described herein are capable of operation in other sequences than described or illustrated herein.

The term "about" as used herein when referring to a measurable value such as a parameter, an amount, a temporal duration, and the like, is meant to encompass variations of +/−10% or less, preferably +/−5% or less, more preferably +/−1% or less, and still more preferably +/−0.1% or less of and from the specified value, insofar such variations are appropriate to perform in the disclosed invention. It is to be understood that the value to which the modifier "about" refers is itself also specifically, and preferably, disclosed.

The recitation of numerical ranges by endpoints includes all numbers and fractions subsumed within the respective ranges, as well as the recited endpoints.

All documents cited in the present specification are hereby incorporated by reference in their entirety.

Unless otherwise defined, all terms used in disclosing the invention, including technical and scientific terms, have the meaning as commonly understood by one of ordinary skill in the art to which this invention belongs. By means of further guidance, definitions for the terms used in the description are included to better appreciate the teaching of the present invention. The terms or definitions used herein are provided solely to aid in the understanding of the invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

An object of this invention is a supplementary cementitious material (SCM) to be used in combination with an activator such as Portland cement to produce a hydraulic binder. Alternatively, the supplementary cementitious material (SCM) may also be used in combination with $Ca(OH)_2$ to produce a hydraulic binder.

The supplementary cementitious material as defined herein is based on physico-chemically treated filter cake product extracted from dredged sediments and can partially replace Portland cement clinker in conventional concrete applications with positive effects on sustainability (reduction of $CO_2$ emissions, upcycling of residues).

The term "dredged sediments" is generally understood to mean sediments which result from dredging. Dredging is an excavation activity which is usually carried out underwater. Dredging may be done in shallow seas, in estuaries, or in freshwater areas. Dredging involves gathering bottom sediments which need to be disposed of. Dredging is generally employed for keeping waterways navigable. Industrial by-products such as tailings from shale oil production are not considered to be dredged sediments as disclosed herein.

In particular, provided herein is a supplementary cementitious material (SCM) comprising up to 30 wt. % quartz ($SiO_2$), up to 15 wt. % feldspars ($(Na,K)AlSi_3O_8$), up to 5 wt. % calcite ($CaCO_3$), up to 5 wt. % anhydrite ($CaSO_4$) and at least 30% amorphous phase.

X-Ray powder Diffraction (XRD) and ThermoGravimetric (TG) analysis is used to determine the phase composition of the SCM. XRD, combined with Rietveld analysis, measures (crystalline) phases. TG detects mass changes upon heating of the samples and can be used to quantify the amount of hydrates/hydroxides or carbonates. More information on how these characterization techniques are used is provided in the examples.

Preferably, the SCM comprises less than 2.5 wt. % free lime. Free lime may cause expansion if present in substantial amounts whereas less than 2.5 wt. % free lime may be considered safe for many applications. Also, the present SCM may be thermally treated (calcined) at relatively low temperatures, such as e.g. 850° C. In SCMs which are calcined at such low temperatures (e.g. 850° C. vs. 1150° C.), free lime is not very likely to cause expansion since it reacts rapidly with water (contrary to "hard-burnt" free lime which underwent calcination at higher temperatures).

The present SCM comprises anhydrite. The presence of anhydrite can enhance the early strength gain of cement in which the present SCMs are used.

Alternatively or additionally, the SCM provided herein may be defined according to their elemental composition. Accordingly, in some embodiments, SCMs provided herein comprise (in wt. % DM): 53-54 $SiO_2$, 10-11 $Al_2O_3$, 12-13 CaO, 1-2 MgO, 8-9 $Fe_2O_3$, 1 $Na_2O$, 1-2 $K_2O$, 0-1 $P_2O_5$, 1-2 $SO_3$, and 0-1 Cl. The abbreviation "wt. % DM" stands for "weight percent, dry-matter-based."

The element composition of the SCM as provided herein was determined by ICP-OES (Inductively Coupled Plasma—Optical Emission Spectrometry). Prior to ICP-OES measurements, the samples were microwave digested in acid ($HCl/HNO_3/HF/H_3BO_3$).

The anion content of the SCM was determined as follows. Total sulfur (reported as $SO_3$) was determined by anion chromatography on the digestion solutions. Finally, water soluble chloride was measured as per ASTM C1218/C, i.e. dissolution in boiling ultrapure water (5 min) cooled down to room temperature and left to rest for 24 h until filtration and measurement by anion chromatography.

As described elsewhere herein, the SCM can be obtained by calcining filter cakes of dredged sediments. In some embodiments, the filter cakes can be obtained by adding lime to the dredged sediments and by subsequently mechanically dewatering of the dredged sediments. Surprisingly, the inventors have found that the calcined filter cakes provided herein show excellent pozzolanic reactivity, even though the dredged sediments have a significant illite fraction, such as an illite fraction of 20-50 wt. %, for example 30-35 wt. %. This is further illustrated in the examples. Excellent pozzolanic activity in the presence of significant amounts of illite is highly surprising indeed as the allegedly deleterious effects of illite on pozzolanic activity seem to be an entrenched prejudice in the prior art. This prejudice is evidenced by, for example, the following references:

[1] R. Fernandez, F. Martirena, K. L. Scrivener, The origin of the pozzolanic activity of calcined clay minerals: A comparison between kaolinite, illite and montmorillonite, Cem. Concr. Res. 41 (2011) 113-122. doi: 10.1016/j.cemconres.2010.09.013.

[2] C. He, B. Osbæck, E. Makovicky, Pozzolanic reactions of six principal clay minerals: activation, reactivity assessments and technological effects, Cem. Concr. Res. 25 (1995) 1691-1702.

[3] C. He, E. Makovicky, B. Osb, Thermal stability and pozzolanic activity of calcined illite, 9 (1995) 337-354.

[4] R. Snellings, G. Mertens, J. Elsen, Evaluation of the pozzolanic activity of natural zeolite tuffs, in: 13th Int. Congr. Chem. Cem., Madrid, 2011.

In some embodiments, 50-60 wt. % of the SCM is composed of an amorphous phase. This amorphous phase may be formed as the reaction product of decarbonated calcite and dehydroxylated clays. The amorphous phase is described in more detail elsewhere herein. In some embodiments, the SCM further comprises 25-27 wt. % quartz, 7-9 wt. % feldspars, 3-4 wt. % calcite, 1-2 wt. % free lime, 2 wt. % anhydrite, and 2-3 wt. % iron oxides.

In order to be optimally applicable as SCM the calcined filter cakes preferably have a fineness comparable to Portland cement. Commonly, Portland cement has a particle size distribution in which the bulk of the cement particles have a size below 63 µm. Accordingly, in some embodiments, at least 80%, preferably at least 90% of the grains of the SCM provided herein have a grain size below 63 µm.

In some embodiments, the amorphous phase comprises $SiO_2$, CaO, $Al_2O_3$, $Fe_2O_3$, MgO, $K_2O$, $Na_2O$, and optionally $SO_3$.

In some embodiments, the amorphous phase comprises 40-55 wt. % $SiO_2$, 10-20 wt. % CaO, 8-20 wt. % $Al_2O_3$ and 8-20 wt. % $Fe_2O_3$.

Preferably, the amorphous phase contains at least 20% glass particles. The glass particles preferably have a median particle size of 20-30 µm. Preferably, the glass particles comprise 10-20 wt. % CaO. The glass particles may be described as rounded and/or spherical.

The weight fractions as provided for the amorphous phase of the SCM are determined by subtracting the chemical composition of all crystalline phases of the SCM from the bulk chemical composition of the SCM as obtained by Inductively coupled plasma atomic emission spectroscopy (ICP-OES).

In some embodiments, at least 80%, preferably at least 90% of the particles in the SCM have a particle size below 63 µm. The particle size distribution provided herein is as measured by laser diffractometry on samples which were dispersed in isopropanol prior to measurement.

In some embodiments the amorphous phase contains 20-40% of spherical glass particles, characterized by a median particle size of about 20-30 µm. Preferably, the glass particles are enriched in Ca (10-20 wt. % CaO) compared to the initial clay minerals present in the dredged sediment (0-5 wt. % CaO).

The present invention stems from surprising results of a testing program on the potential reuse applications for filter cake products from dredged sediments. The surprising effect is found when the dredged sediments are appropriately physico-chemically pretreated and calcined. The treated and calcined product shows a pozzolanic reactivity and contribution to the compressive strength of blended cement products (e.g. mortar and concrete) that is significantly higher than what would be expected from prior art. Based on the mineralogical composition of dredged sediment, its pozzolanic reactivity was expected to be negligible and its contribution to compressive strength development low, i.e. merely confined to a filler effect (i.e. accelerating the reaction of the clinker phases, but not supplementing it with an additional reaction). The inventors surprisingly found the treated material to be positively pozzolanically reactive, both before and after thermal treatment. Preferably, the material is thermally treated as this improves its contribution to the compressive strength development of the blended cement products (mortar and concrete). This enables the material to be used at high Portland cement replacement levels (e.g. about 35 wt. % based on total clinker content) without significant reduction in strength of the final products.

Accordingly this invention relates to a new supplementary cementitious material derived from dredging sediments that can be used in combination with a hydraulic cement to produce new binders.

Dredging sediments commonly comprise a coarse fraction and a fine fraction. The dredging sediments are physicochemically treated in such a way as to separate and concentrate the fine fraction, the resulting sludge comprising the fine fraction is dewatered and activated by thermal treatment to produce the invented SCM product. The fine fraction is a fraction of the dredged sediments of which at least 70 wt. % DM of the grains, preferably at least 90 wt. % DM of the grains is smaller than about 63 μm (cut-off grain size).

The terms "dredging sediments" and "dredged sediments" as used herein can be used interchangeably.

The invention further relates to a method of producing the SCM from dredging sediments by applying 1) a physicochemical separation and pre-treatment and 2) a thermal activation treatment.

One way of obtaining the SCM from dredged sediments according to the present invention is outlined in the next paragraphs.

A first step is to first separate and concentrate the fine fraction (<63 μm, cut-off grain size) of the dredged sediments. This can be done in several physical treatment steps in a sand separation unit, for instance by sieving and classification operations and hydrocyclones. The fine fraction is recovered as a sludge.

The solid phase of the sludge is then concentrated by settling. In a next step the concentrated sludge is chemically treated using portlandite ($Ca(OH)_2$—2 to 10 wt. % DM). Portlandite is normally used to facilitate and optimize the dewatering of the sludge by enhancing consolidation. Without restricting the invention to any particular theory of operation, the inventors surprisingly found a chemical reaction to occur between the sludge and the portlandite which facilitates beneficial effects by creating intimately mixed, readily activated amorphous calcium aluminosilicate hydrate compounds.

The term "portlandite" as used herein refers to the chemical $Ca(OH)_2$ and is synonymous to slaked lime.

In a next step, excess water is removed from the sludge, for instance by mechanical dewatering using membrane filter pressing resulting in a filter cake product which is further dried during storage.

The term "dried filter cake precursor" encompasses products that are preferably composed of fine-grained hydrous aluminosilicates such as minerals from the phyllosilicate group but also calcium (alumino-) silicate hydrates. Additional components may be fine-grained quartz and carbonates. The term fine-grained as used herein refers to a substance having a grain size predominantly smaller than 63 μm (cut-off grain size), i.e. the fine fraction comprises less than 30 wt. %, preferably less than 10 wt. % grains having a grain size larger than 63 μm, wherein grain size is measured by means of sedimentation analysis.

Accordingly, provided is a method for producing a supplementary cementitious material. The method comprises the following steps:
a) providing dredged sludge comprising at least 50 wt. % to at most 90 wt. % water, at least 0 to at most 60 wt. % dry matter-based (DM) coarse fraction, and at least 40 wt. % DM fine fraction;
b) removing the sand fraction from the dredged sludge, thereby retaining the fine fraction of the dredged sludge, the fine fraction comprises less than 30 wt. %, preferably less than 10 wt. % grains having a grain size larger than 63 μm;
c) adding of portlandite (slaked lime, $Ca(OH)_2$), or quicklime (CaO) to the fine fraction;
d) dewatering of the fine fraction, thereby forming dried filter cake precursor; and,
e) thermally treating the dried filter cake precursor.

The grain size of the fine fraction of the dredged sludge as provided herein is measured using sedimentation analysis.

Preferably, the supplementary cementitious material produced by the method is a supplementary cementitious material provided herein.

In some embodiments, the dewatered dredged sediments (also called dried filter cake precursor) comprise an intimate mix of carbonates (calcite, aragonite), clay minerals, quartz, and feldspars, and an amorphous phase. Note that wt. % DM is short for weight percent, dry-matter based. The clay fraction may comprise illite, smectite, kaolinite, and glauconite. In some embodiments, the dewatered sediments comprise at least 30 wt. % illite DM, and less than 10 wt. % DM smectite, kaolinite, and/or glauconite.

As described hereunder, step c may involve calcination of the dried filter cake precursor. The presence of calcite in the dried filter cake precursor has a fluxing effect during calcination: it facilitates the decomposition of the clay minerals and enhances the formation of melt droplets. When for example flash calcination is used (further explained below) these melt droplets are rapidly quenched and as result a Ca-rich aluminosilicate glass forms. This Ca-rich aluminosilicate glass is a highly reactive amorphous phase which enhances the pozzolanic activity of SCMs provided herein. This is further exemplified in example 8.

In some embodiments, fine fraction of dredged sediments comprises 20 to 40 wt. % DM illite, 0 to 10 wt. % DM chlorite, 0 to 10 wt. % DM glauconite, 0 to 10 wt. % DM kaolinite, less than 5.0 wt. % DM organic carbon, and less than 0.2 wt. % DM chloride.

The composition of the dredged sediments can also be described in terms of their elemental composition, as opposed to their constituent phases. Accordingly, in some embodiments, the uncalcined filter cakes used as a raw material for SCMs provided herein comprise (in wt. % on an after ignition basis, i.e. after heating at 1050° C. during 2 h): 50-60 $SiO_2$, 10-11 $Al_2O_3$, 13-15 CaO, 2 MgO, 8-9 $Fe_2O_3$, 0-1 $Na_2O$, 2-3 $K_2O$, 1-2 $SO_3$, and 0-1 Cl.

The fine-grained hydrous aluminosilicates may comprise a) 2:1 phyllosilicates such as illite, glauconite and smectite-group minerals, b) 1:1 phyllosilicates such as kaolinite, and c) chlorite-group phyllosilicates. The calcium (alumino-) silicate hydrates may comprise nanocrystalline calcium (alumino-)silicate hydrates, stratlingite, hydroxy-AFm, hydrogarnet and hydrocalumite. The carbonates may comprise calcite, aragonite, vaterite and dolomite. Preferably, the physico-chemically treated, dried filter cake product is further processed by thermal treatment, whereby activated amorphous (calcium)-aluminosilicates are formed (40-100 wt. % DM). Preferably, formation of crystalline high temperature phases is avoided; for example, the crystalline high temperature phases of which the formation is preferably avoided may comprise one or more phases chosen from the list comprising: mullite, cristobalite, anorthite and spinels.

One way of advantageously heat-treating the physico-chemically treated, dried filter cake product may be by flash calcination, using short residence times (0.1-10 s) and maximum temperatures of 800-1100° C., preferably 900-1100° C. An alternative way may be by using heat treatments in a static furnace or rotary kiln using residence times of 20 min to 3 h and a maximum temperature between 550-800° C., preferably 650-750° C. These treatments allow dehydroxylation of the dried filter cake precursor. Note that the terms "dried filter cake product" and "dried filter cake precursor" as used herein may be used interchangeably. Accordingly, in some embodiments, step e) involves dehydroxylation of the dried filter cake precursor.

In some embodiments, step e) involves calcination of the dried filter cake precursor. By calcining the dried filter cake precursor, can be dehydroxylated. The calcination is described in more detail hereunder.

In some embodiments, the filter cakes are dried prior to calcination. In some embodiments, the drying may take place at 110° C. for 48 hours. In some embodiments, the dried filter cakes are ground prior to flash calcination.

In some embodiments, step e) involves flash calcination of the dried filter cake precursor. Flash calcination strongly reduces the total organic carbon fraction while chloride and sulfate levels remain unchanged. A further advantage is that flash calcination results in complete dehydroxylation of the clay materials in the filter cake (within an experimental accuracy of 1-2 wt. %). Yet another advantage is that calcium carbonates can be partly decarbonated during flash calcination, and decarbonated calcium carbonates recombine with dehydroxylated clays to form a main reactive component of the filter cake. Accordingly, the presence of calcite enhances the pozzolanic activity of the calcined filter cakes. The calcium carbonates which are decarbonated may be (partly) present in the dredged sediments and/or they may be (partly) formed by carbonation of added lime.

In some embodiments, flash calcination involves heating the dried filter cake precursor for at least 0.10 s to at most 10 s at a temperature of at least 800° C. to at most 1100° C.

In some embodiments, flash calcination of dried filter cake precursors (in other words, lime-treated filter cakes) may involve a calcination temperature of 800-920° C. and a residence time of 0.5 to 2 s, preferably of 1 s.

Surprisingly, flash calcination at these relatively low temperatures results in melt formation. In particular, calcium oxide seems to be released from calcite or other decomposed phases and acts as a flux.

Figure 6:
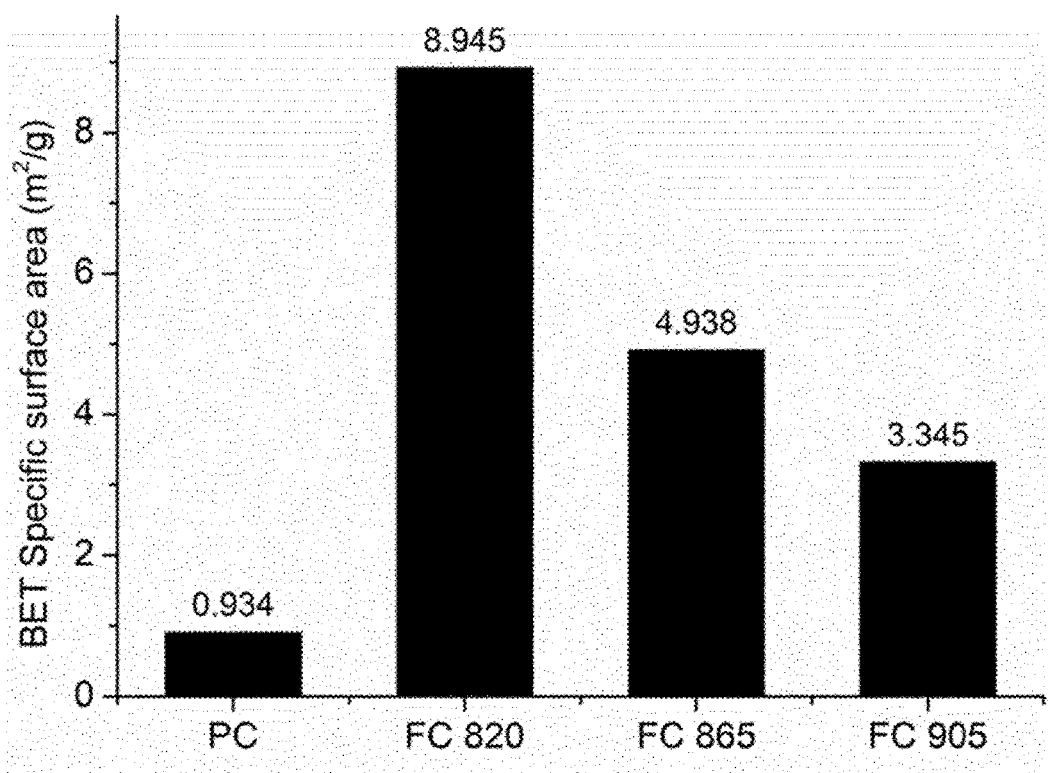
FIG. 6 shows the BET (Brunauer-Emmett-Teller) specific surface area for Portland cement (PC), and for SCMs comprising flash calcined filter cakes.

Also, more melting and sintering is observed at higher calcination temperatures and this leads to a reduction of the specific surface area and related particle surface roughness. A smaller specific surface area correlates with a lower water demand of the final cement in which the calcined filter cake is used as a supplementary cementitious material. This enables to use the cement at lower water to binder ratios and thus to achieve higher concrete compressive strengths without water reducing agents such as superplasticisers. Supportive data and specific embodiments are shown in FIG. 6 and in example 7.

As shown in example 8, flash calcination in this time-temperature window results in complete dehydroxylation, and the formation of spherical glass particles and partially molten and sintered aggregate particles. The decomposition of the clay minerals and formation of spherical and aggregate particles lowers the water demand and enhances the pozzolanic activity of the SCM.

In some embodiments, step e) involves heating the dried filter cake precursor in a static kiln, such as a box furnace or rotary kiln; to a temperature between at least 550° C. and at most 850° C., preferably between at least 650° C. and at most 750° C.; for at least 20 minutes to at most 3 hours.

In some embodiments, calcination in a static kiln, also termed batch calcination, of lime-treated filter cakes may involve calcination in a furnace at 650° C. with a residence time of 5 h.

In some embodiments, step e) involves heating the dried filter cake precursor in a rotary kiln; to a temperature between at least 550° C. and at most 850° C., preferably between at least 650° C. and at most 750° C.; for at least 20 minutes to at most 3 hours.

Calcination in a rotary kiln is a specific type of batch calcination. Batch calcination temperatures provided herein are material temperatures, i.e. the batch calcination temperatures provided herein refer to the average temperature reached by the calcined material during batch calcination.

Flash calcination and batch calcination of lime-treated filter cakes may lead to similar conversion reactions. Notwithstanding this observation, flash calcination confers certain advantages which are detailed elsewhere.

Calcination of lime-treated filter cakes may involve the decomposition and/or collapsing of clay minerals such as illite (I), smectite (S), and kaolinite.

Batch and/or flash calcination of lime-treated filter cakes may involve the (partial) decomposition of Calcite (Cc).

Anhydrite ($CaSO_4$-An) may be formed during flash calcination and/or batch calcination of lime-treated filter cakes.

Flash or batch calcination of lime-treated filter cakes may result in an amorphous phase of about 50±10 wt. % in the calcined filter cake.

In some embodiments, the dried filter cake precursor comprises at least 40 to at most 99 wt. % DM hydrous aluminosilicates and at least 1 to at most 15 wt. % DM calcium (alumino-)silicate hydrates; wherein the calcium (alumino-)silicate hydrates are products of the pozzolanic reaction between $Ca(OH)_2$ and the fine fraction of the dredged sludge.

In some embodiments, step c involves adding a hydraulic binder comprising portlandite ($Ca(OH)_2$) to the fine fraction of the dredged sediments in a quantity of 2 to 10 wt. % DM, or wherein step c involves adding a hydraulic binder comprising quicklime (CaO) in a quantity of 2 to 7 wt. % DM.

In some embodiments, the fine fraction comprises less than 60 wt. % physisorbed water.

In some embodiments, step d) involves mechanically dewatering the fine fraction.

Preferably, the calcined filter cake product is ground and used as a supplementary cementitious material in combination with a hydraulic binder that creates an alkaline environment for the material to react in. In one preferred embodiment the hydraulic binder is Portland cement having a $C_3S$ (cement chemist's notation) content greater than 50 wt. %, more preferably greater than 60 wt. %. The Portland cement is preferably ground to a Blaine fineness of 200-800 $m^2$/kg. The calcined filter cake product is preferably ground to a Blaine fineness of 500-5000 $m^2$/kg, preferably 900-2000 $m^2$/kg for optimal reactivity and workability. It was found that adequate strengths were developed in cement and concrete products when high levels of Portland cement were replaced by the invented SCM, wherein the term "high levels" refers to the replacement of Portland cement by cement by more than about 35 wt. %, for example about 40 wt. %. Therefore, in a preferred application of the invention, the invented SCM replaces Portland cement by 5 wt. % to 70 wt. %, preferably by 10 wt. % to 40 wt. %, more preferably by 20 wt. % to 40 wt. %. The resulting blended cement is purposed to be used in mortar and concrete products.

The Blaine fineness is measured according to ASTM C204.

Further provided is the use of the fine fraction of dredged sediments for the manufacture of a supplementary cementitious material, the fine fraction comprising less than 30 wt. %, preferably less than 10 wt. % grains having a grain size larger than 63 μm, wherein grain size is measured by means of sedimentation analysis.

Grain sizes as reported herein are measured by means of sedimentation analysis.

The dredged sediments are described in more detail throughout this specification.

In some embodiments, the fine fraction of dredged sediments comprises at least 30 wt. % dry matter-based (DM) illite, 0 to 10 wt. % DM chlorite, 0 to 10 wt. % DM glauconite, 0 to 10 wt. % DM kaolinite, less than 5.0 wt. % DM organic carbon, and less than 0.2 wt. % DM chloride.

Further provided is a hydraulic binder comprising Portland cement and an SCM provided herein, and/or an SCM obtained through a method provided herein; wherein the supplementary cementitious material is present in a concentration of 5-70 wt. %, preferably 10-40 wt. %, more preferably 20-40 wt. %.

EXAMPLES

The filter cake product in the examples 1 to 3 is obtained through the aforementioned physico-chemical treatment of the fine fraction of dredging sediments. An exemplary physico-chemical treatment of the fine fraction of dredging sediments is described in example 4.

Before heat treatment, the filter cake product processed into the SCMs used in examples 1 to 3 comprises 2:1 Al clay minerals—illite (30-35 wt. % DM), fine-grained quartz (20-25 wt. % DM), an inorganic amorphous phase (15-20 wt. % DM) and calcite (10-15 wt. % DM); with the remainder comprising aragonite, 2:1 Fe clay minerals—glauconite, kaolinite and feldspars.

Example 1

The filter cake product was flash calcined using three different temperature profiles with maximum temperatures set between 925 and 1075° C. The Blaine fineness of the calcined filter cake products was between 550 and 700 m²/kg. The reference cement was a CEM I 52.5N type cement. Mortar bars were prepared and tested according to EN 196-1.

TABLE 1

|  | Flash calcinations regime (flame temperature) | | |
| --- | --- | --- | --- |
|  | 1075° C. | 1040° C. | 925° C. |
| Cement (wt. %) in binder | 100 | 65 | 65 | 65 |
| Calcined filter cake (wt. %) in binder | 0 | 35 | 35 | 35 |
| 28 day compressive strength (MPa) | 67 | 66 | 66 | 57 |
| 28 day strength activity index (MPa) | — | 0.99 | 0.99 | 0.85 |

This example shows that, at a 35 wt. % replacement of cement by flash calcined filter cakes calcined at 1075° C. or 1040° C. (flame temperature), a strength comparable to the reference cement can be obtained. The filter cake contribution to strength depends on the calcination regime and can be optimised.

The above-mentioned temperatures of 1075° C. and 1040° C. are flame temperatures. Flame temperature refers to the temperature reached in the flash calciner's flame. These flame temperatures correspond to material temperatures of 905° C. and 865° C., respectively. The material temperature is the average temperature which is reached by the calcined material during flash calcination.

Example 2

The filter cake product was batch calcined in a static furnace at two different temperatures (550 and 650° C.) and subsequently ground to a Blaine fineness of about 1100 m²/kg. The reference cement was a CEM I 42.5 R type cement. Mortar bars were prepared according EN 196-1, with the exception of a higher water to cement ratio of 0.6 (weight by weight).

TABLE 2

|  | Calcination temperature (° C.) | |
| --- | --- | --- |
|  | 550 | 650 |
| Cement (wt. %) in binder | 100 | 65 | 65 |
| Calcined filter cake (wt. %) in binder | 0 | 35 | 35 |
| 28 day compressive strength (MPa) | 33 | 29 | 30 |
| 28 day strength activity index (MPa) | — | 0.89 | 0.92 |

This example shows that blended cement mortars containing 35 binder wt. % of filter cakes calcined in a static furnace develop only slightly lower strengths than the reference cement mortars. The contribution to compressive strengths of the calcined filter cakes is much higher than what would be expected from a dilution of the cement binder by an inert filler.

Example 3

In this example the pozzolanicity of the blended cements containing batch calcined (BC) filter cakes (550 and 650° C.) and non-calcined filter cake is tested according to EN 196-5. The reference cement was a CEM 152.5N. The result is positive if the samples plot below the portlandite (Ca(OH)$_2$ solubility curve. This is shown in FIG. 1, which shows EN 196-5 test results. All tested blended cement fall below the portlandite solubility curve resulting in a positive test result for pozzolanicity.

This example shows that a pozzolanic reaction occurs in all tested blended cement formulations. Thus, both the untreated and calcined filter cakes are shown to be reactive towards portlandite and contain active components that will act as a pozzolanic material when combined with cement.

Example 4

Figure 2:
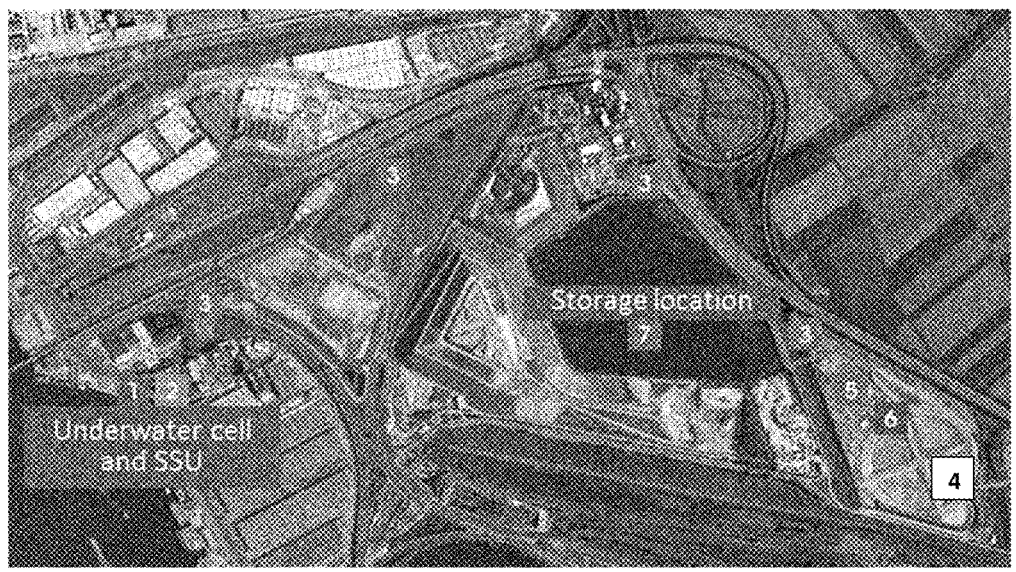
FIG. 2 shows an exemplary dredging sludge treatment facility for manufacturing filter cakes. The filter cakes can be used as a starting product for manufacturing the SCM.
Figure 3:
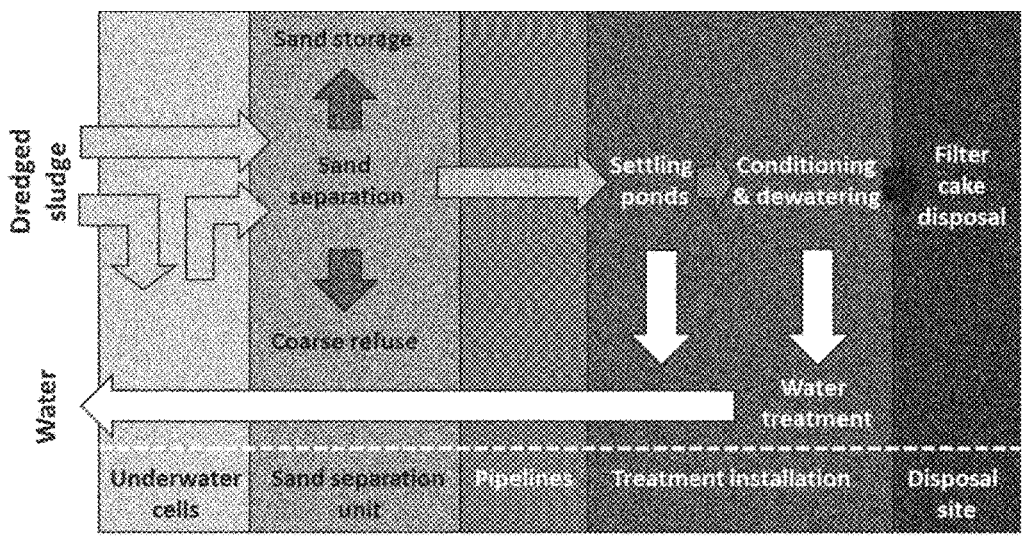
FIG. 3 shows an exemplary dredging sludge treatment process for manufacturing filter cakes. The filter cakes can be used as a starting product for manufacturing the SCM.

An overview of the steps of the dredging sediment processing scheme is given in FIGS. 2 and 3. Preceding the actual dredging operation, the targeted sediment is sampled and analysed to verify whether the sediment is in line with the environmental acceptance criteria of the underwater cells (1). If so, the dredged sediments are accepted to enter the cells. The temporary storage of the sediments in the underwater cells enables to homogenize the sediments and provides a better controlled, more continuous supply to the treatment plant because of the associated buffer capacity. The sediments in the underwater cells are pumped into a sand separation unit (SSU) (2). After a first separation of the coarse refuse and the >8 mm fraction by screening and sieving, the >2 mm fraction is removed by adjustable hydrocyclones. The resulting <2 mm fraction or sludge is pumped through a pipeline (3) to settling ponds (4). There, the sludge is left to settle for maximum 1 week before being pumped into the treatment installation (5). In the treatment installation slaked lime is added to the sludge to facilitate the dewatering operation and optimize the sludge properties for further valorisation as SCM. Membrane filter presses are used to dewater the sludge and produce the precursor filter cakes (<63 μm) which are stored in a storage facility (7) awaiting further processing by heat treatment. Note that the precursor filter cakes may comprise up to 10 wt. % DM, preferably no more than 5 wt. % DM grains having a grain size larger than 63 μm, as determined by means of sedimentation analysis. Similarly, the >8 mm fraction and the >2 mm fractions may comprise up to 10 wt. % DM, preferably no more than 5 wt. % DM grains having a grain size smaller than 8 mm or 2 mm, respectively.

Example 5

Figure 4:
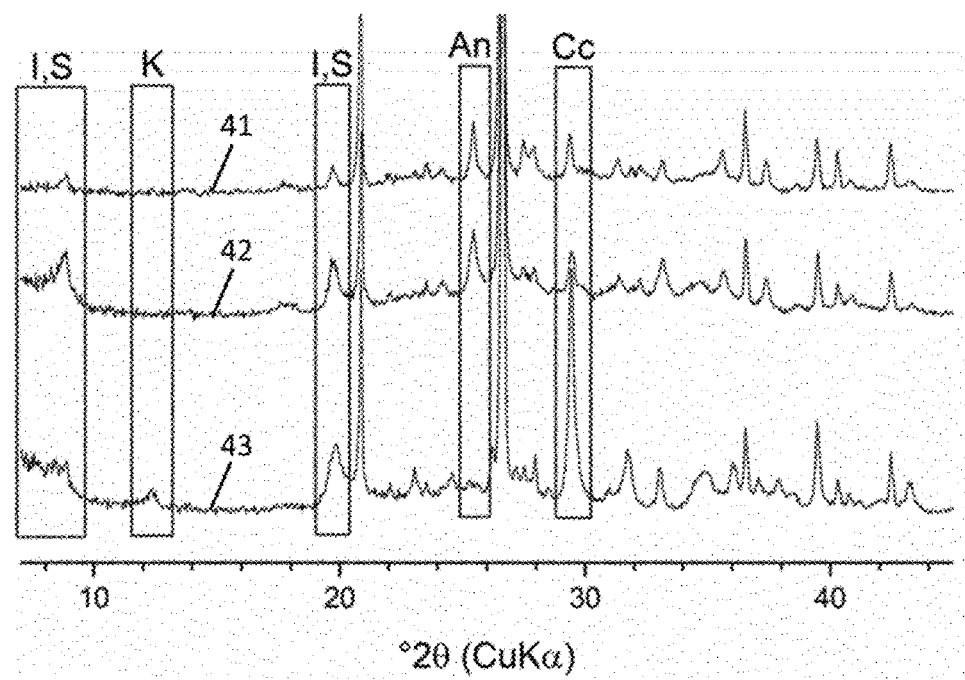
FIG. 4 shows three super-imposed X-ray diffraction (XRD) patterns.

XRD (X-ray diffraction) patterns are shown in FIG. 4. In particular, three super-imposed XRD patterns are shown: one XRD patterns of non-calcined filter cake (43), one XRD pattern of flash calcined filter cake (41), and one XRD pattern of batch calcined filter cake (42). Flash calcination and batch calcination lead to similar conversion reactions. In FIG. 4, the following abbreviations are used: illite (I), smectite (S), kaolinite (K), anhydrite (An), and calcite (Cc).

The batch calcined filter cake was calcined in a box furnace at 650° C. with a residence time of 5 h. The flash calcined filter cake was calcined in a flash calcination furnace at a temperature of 865° C. (material temperature), with a residence time of 1 s. The XRD patterns of FIG. 4 clearly show that both calcination methods lead to similar mineral conversion reactions in the filter cake sample. Clay minerals such as illite (I), smectite (S), and kaolinite are decomposed/collapsed upon calcination. Calcite (Cc) is partially decomposed by both the flash calcination and the batch calcination. Anhydrite ($CaSO_4$-An) is formed during both flash calcination and batch calcination. Also, phase quantification by Rietveld analysis shows similar levels of amorphous phase of 50±5 wt. % in both calcined samples.

Example 6

In a further example, reference is made to the chemical composition of several exemplary supplementary cementitious materials (SCMs) provided herein. These SCMs are formed of flash-calcined filter cakes, the composition of which is shown in the table below.

| Sample | a wt. % dm | b wt. % dm | c wt. % dm | d wt. % dm | Filter cake wt. % ib |
|---|---|---|---|---|---|
| $SiO_2$ | 53.69 | 54.34 | 54.12 | 52.1 | 59.0 |
| $Al_2O_3$ | 10.43 | 10.15 | 10.71 | 13.0 | 10.7 |
| CaO | 12.48 | 12.24 | 13.32 | 14.5 | 14.0 |

-continued

| Sample | a wt. % dm | b wt. % dm | c wt. % dm | d wt. % dm | Filter cake wt. % ib |
|---|---|---|---|---|---|
| MgO | 1.71 | 1.71 | 1.82 | 2.0 | 2.0 |
| $Fe_2O_3$ | 8.69 | 8.28 | 8.66 | 11.1 | 8.8 |
| $Na_2O$ | 0.81 | 0.78 | 0.82 | 0.6 | 0.8 |
| $K_2O$ | 2.11 | 1.94 | 2.13 | 2.8 | 2.13 |
| $P_2O_5$ | 0.89 | 0.97 | 0.99 | n.a. | n.a. |
| $SO_3$ | 1.50 | 1.52 | 1.57 | 1.9 | 1.67 |
| Cl | 0.14 | 0.16 | 0.19 | n.a. | 0.14 |
| TOC | 0.31 | 0.25 | 0.18 | n.a. | 2.49 |
| LOI | 2.90 | 2.10 | 2.39 | n.a | 0 |

Samples a, b, and c are flash calcined samples, wherein the flash calcination involved a residence time of 1 s. The respective calcination temperatures are 820° C. for sample a, 865° C. for sample b, and 905° C. for sample c (materials temperatures). Sample d is a batch calcined sample which was calcined at 650° C. for 6 h. The chemical composition of an uncalcined filter cake (column Filter cake).

The chemical composition of samples a-c, and the chemical composition of the filter cake, was determined using ICP-OES, as described elsewhere herein. For sample d, the chemical composition was determined using X-ray fluorescence (XRF). For the filter cake, the chemical composition of the untreated filter cake was reported on ignited basis, i.e. the mass remaining after heating at 1050° C. for 2 h.

With respect to flash calcination (samples a-c), the effect of calcination temperature on chemical composition is mostly insignificant in terms of the major elements. Most variations do not show consistent trends with increasing temperature and are therefore deemed to be related to sampling and/or measurement uncertainty. Only the total organic carbon content slightly decreases with increased calcination temperature. Overall, the main observation is that within the tested range of 820-905° C. the calcination temperature has little effect on potentially volatile components such as sulfate, chlorine and organic carbon compounds.

The lower $SiO_2$ and higher $Al_2O_3$ and $Fe_2O_3$ content of sample d compared to samples a-c is most likely due to a lower sand content in sample d. Variations in sand content are most likely due to variations in sediment pre-treatment, such as sand separation cut-off. This is explained by quartz ($SiO_2$) being the main sand fraction component in these samples, while the fine fraction is richer in clay minerals (aluminosilicates) and Fe-(oxy)hydroxides.

In terms of potentially volatile elements (e.g. Cl, Sulfate, and organic carbon) it can be observed that both sulfate and Cl are not emitted during the flash-calcination process. Chlorine and sulfate contents are approximately the same before and after calcination. Organic carbon levels are strongly reduced by the thermal treatment. Also the total loss on ignition (LOI) reduces strongly, from 16.42% (not shown) before calcination to 2.46% after calcination (not shown).

Example 7

Figure 5:
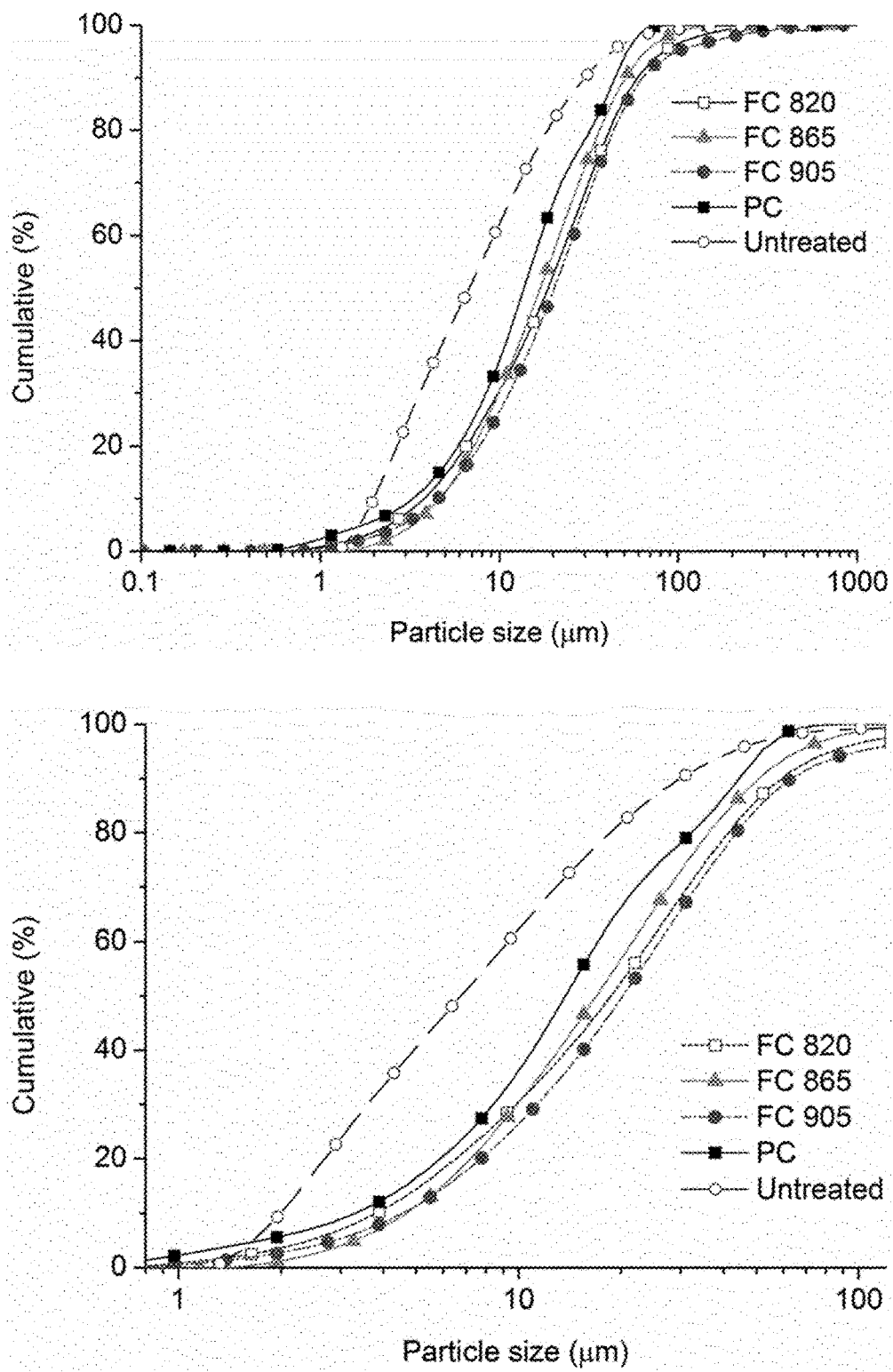
FIG. 5 shows the particle size distribution of three samples which were flash calcined, the particle size distribution of a typical Portland cement, and the particle size distribution of untreated dredged sediments.

In a further example, the physical properties of the flash calcined filter cakes of example 6 are described. In particular, the particle size distribution of samples a to c is shown in FIG. 5, together with the particle size distribution of a CEM I type Portland cement, and with the particle size distribution of untreated filter cakes. In particular, sample a is labeled FC 820, sample b is labeled FC 865, and sample c is labeled FC 905.

In order to be applicable as SCM the calcined filter cakes preferably have a fineness comparable to Portland cement. The results in FIG. 5 show that the fineness of the three flash-calcined filter cakes is only marginally higher than that of cement and comparable to coal combustion fly ashes commonly used as SCM. The calcination temperature has little effect on the particle size distribution. However, compared to the untreated filter cake, the calcined filter cake is significantly coarser. This indicates that irreversible particle agglomeration by sintering or melting occurs upon calcination.

In FIG. 6, the BET (Brunauer-Emmett-Teller) specific surface area is shown for Portland cement (PC), and for filter cakes corresponding to samples a-c, which were flash calcined at 820° C. (FC 820), at 865° C. (FC 865), and at 905° C. (FC 905). The BET specific surface area is found to depend significantly on calcination temperature. The higher the calcination temperature, the lower the specific surface area. The BET specific surface area is a measure of the total surface area accessible to the adsorbing $N_2$ molecules. The ratio of the geometric surface area (calculated from the particle size distribution assuming a spherical particle shape) to the BET specific surface area gives an indication of the surface roughness. Given that the particle size distributions of the calcined filter cakes is practically identical, the observed decrease in BET specific surface area is indicative for a strong reduction in particle surface roughness.

A decrease in specific surface is usually related to a lower water demand of the blended cement. This enables to use the cement at lower water to binder ratios and thus to achieve higher concrete compressive strengths without water reducing agents such as superplasticisers.

Figure 7:
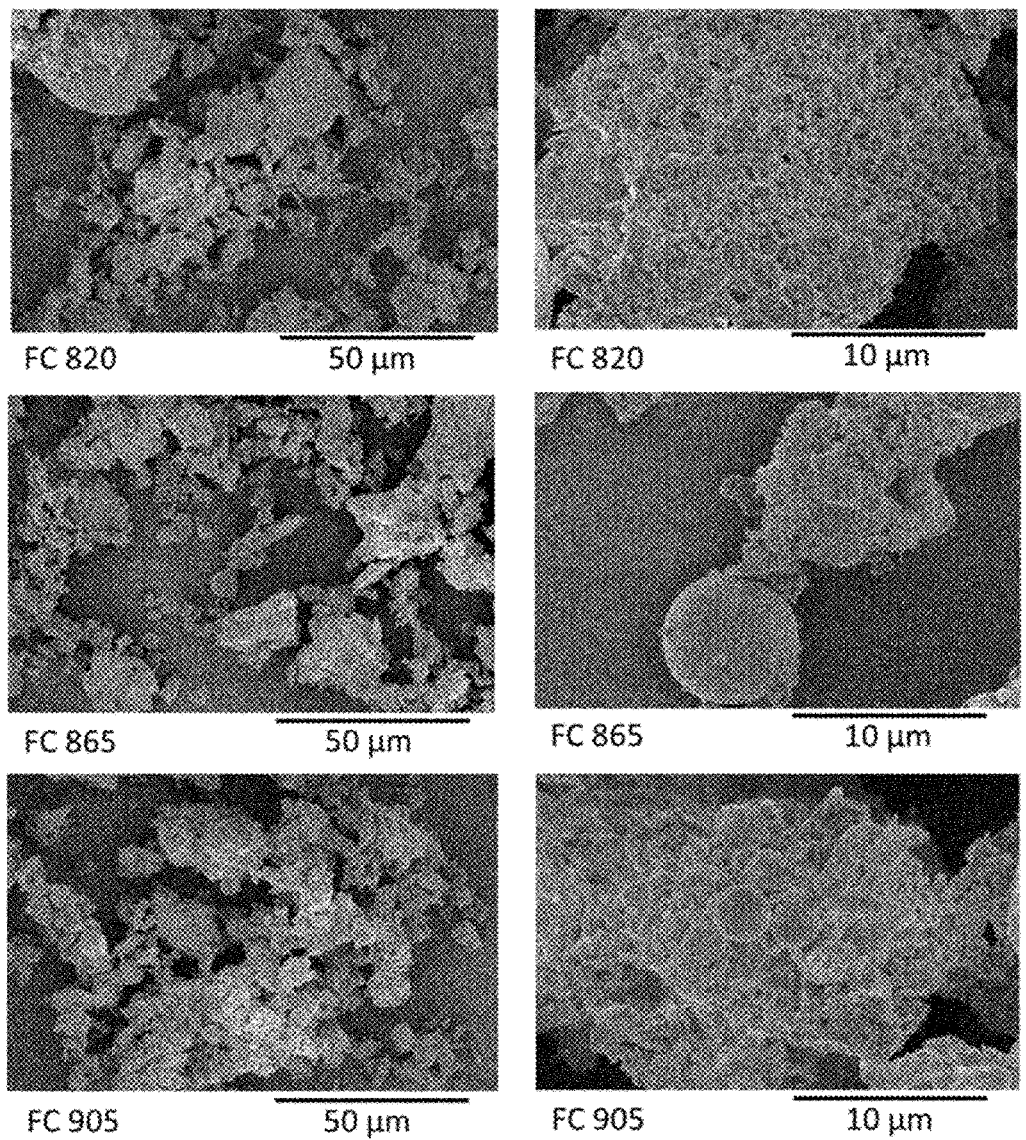
FIG. 7 shows a selection of representative secondary electron microscopy (SEM) images for the filter cakes flash calcined at three different temperatures.

The effect of calcination temperature on particle morphology is illustrated by SEM (Secondary Electron Microscopy) images of powder mounts in FIG. 7. FIG. 7 shows a selection of representative SEM images for the filter cakes flash calcined at three different temperatures: 820, 865, and 905° C. At the lowest calcination temperature of 820° C. the powders mainly consist of irregular aggregates smaller than 30-40 μm. In addition a few larger silt/sand particles can be recognized. FIG. 7 shows remnant imprints of the membrane filters used in the dewatering step. These "imprints" are easily recognized by their characteristic regular hexagonal "honeycomb" patterns. Next to these features a few spherical particles are recognized, these are indicative for local melting processes and resemble typical fly ash "cenospheres". The size of these spherical particles varies from a few microns up to 20 μm. At higher calcination temperatures, spherical particles get more common. Features typical for sintering can be observed at the particle surfaces: edges become more rounded and smaller particles are fused into aggregates. This trend compares well to the decrease in surface roughness derived from the BET specific surface area data, which is shown in FIG. 6. Higher calcination temperatures thus lead to 1) particle agglomeration and reduced surface roughness due to sintering, and 2) local melting resulting in the formation of spherical glass particles.

Example 8

In a further example, reference is made to exemplary phase compositions of supplementary cementitious materials provided herein.

In particular, the phase composition of the calcined filter cakes was determined in two steps. First the absolute content of crystalline materials was determined by XRD (x-ray diffraction analysis). The remaining amorphous content was then determined by difference to 100%. TG results were used as cross-check and to verify whether calcination (dehydroxylation) was complete. Since the identified and quantified crystalline materials are known not to be reactive, in a second step the properties of the reactive amorphous phase were investigated in more detail by BSE (Backscattered Electron) image analysis.

Figure 8:
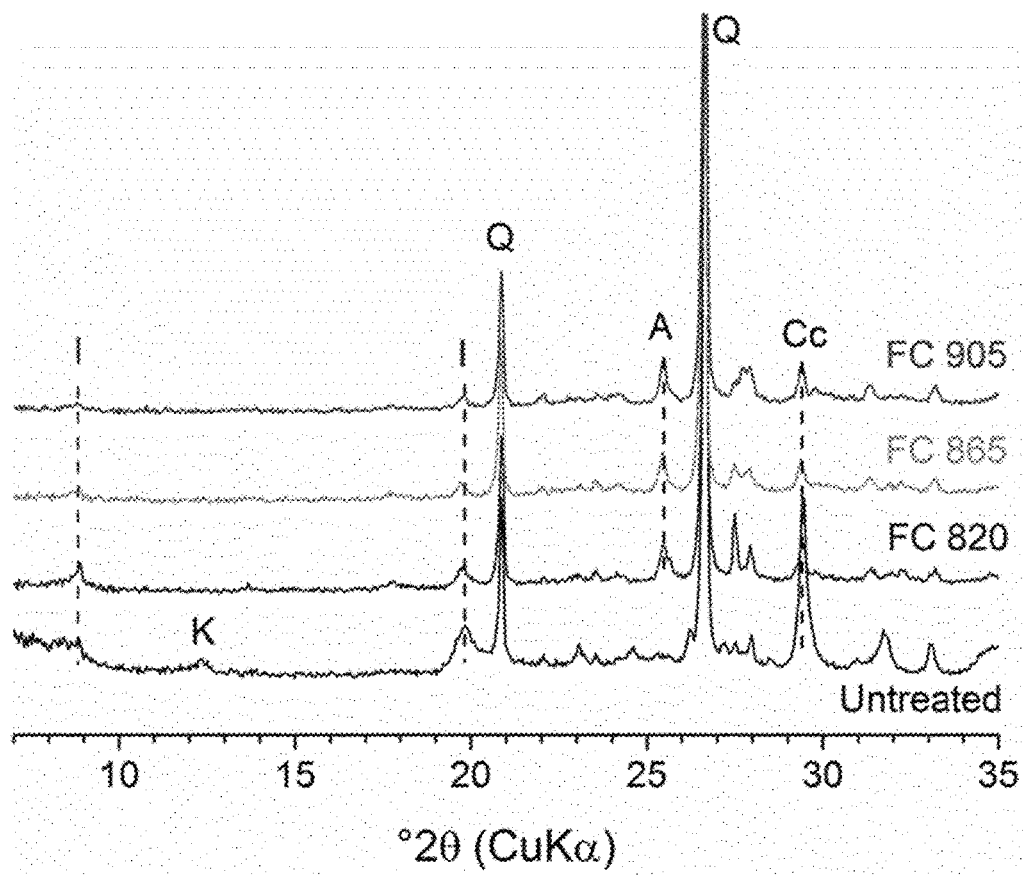
FIG. 8 shows XRD patterns for untreated and flash calcined filter cakes.

Excerpts of the XRD patterns are shown in FIG. 8. The respective Rietveld analysis quantification results are given in table 8.1 for calcined filter cakes and in table 8.2 for Portland cement.

TABLE 8.1

Phase composition determined by XRD-Rietveld analysis of the untreated and calcined filter cakes.

| Phase composition (wt. %) | Untreated | FC 820 | FC 865 | FC 905 |
|---|---|---|---|---|
| Quartz ($SiO_2$) | 20 | 26 | 27 | 25 |
| Feldspars ((Na, K)$AlSi_3O_8$) | 4 | 7 | 8 | 9 |
| Calcite ($CaCO_3$) | 13 | 4 | 4 | 3 |
| Other carbonates | 8 | — | — | — |
| Pyrite ($FeS_2$) | 1 | — | — | — |
| Anhydrite ($CaSO_4$) | | 2 | 2 | 2 |
| Free lime (CaO) | | 2 | 1 | 1 |
| Fe-oxides (hem/mag) ($Fe_2O_3$/$Fe_3O_4$) | | 2 | 3 | 3 |
| 2:1 clay (illite) | 34 | 14 | 6 | 6 |
| Kaolinite ($Al_2Si_2O_5(OH)_4$) | 3 | | | |
| Amorphous | 17 | 45 | 49 | 51 |

Calcium carbonates (e.g. calcite, aragonite, . . . ) are largely decomposed in the calcination process, only a few percent of calcite, as most stable polymorph, remain after calcination. Part of the CaO released in the decomposition of the calcium carbonates, recombines with sulfate to form anhydrite. In addition a small amount of free lime is found in the calcined samples. A simple mass balance calculation shows that approximately half of the released CaO is incorporated into the amorphous phase. The chemical composition of the amorphous phase can be estimated by subtracting the chemical composition of all crystalline phases from the bulk chemical composition as determined by ICP-OES. In particular, the main components of the amorphous phase are $SiO_2$, CaO, $Al_2O_3$ and $Fe_2O_3$. Compared to the bulk composition $SiO_2$ levels are decreased, vice versa CaO, $Al_2O_3$ and $Fe_2O_3$ are increased. More specifically, the amorphous phase was found to comprise the following constituents: 45% $SiO_2$, 17% CaO, 14% $Al_2O_3$, 14% $Fe_2O_3$, 4% MgO, 2% $K_2O$, 2% $Na_2O$, 1% $SO_3$.

Figure 9:
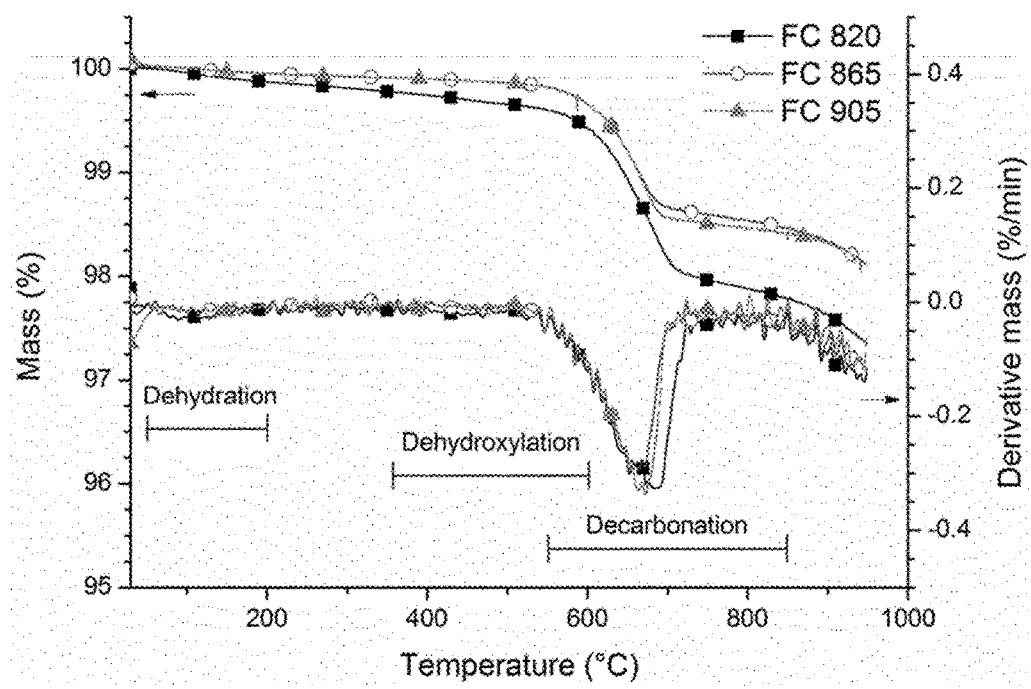
FIG. 9 shows ThermoGravimetric (TG) and Differential ThermoGravimetric (DTG) analyses of calcined filter cakes.

ThermoGravimetric (TG) and Differential ThermoGravimetric (DTG) analyses of the calcined filter cakes were carried out to verify the extent of clay mineral dehydroxylation and the content of carbonates. The TG-DTG results are given in FIG. 9. Weight loss over the dehydration and dehydroxylation interval is negligible for FC865, FC905 and very low for FC820. Therefore it can be concluded that clay dehydroxylation is complete (within the experimental accuracy of 1-2 wt. %) for FC865 and FC905, and nearly complete for FC820. It should be noted that clay dehydroxylation not necessarily results in the decomposition of the layered clay crystal structure. Indeed, 2:1 clay minerals largely retain their layered structure upon dehydroxylation, as shown in R. Fernandez, F. Martirena, K. L. Scrivener, The origin of the pozzolanic activity of calcined clay minerals: A comparison between kaolinite, illite and montmorillonite, Cem. Concr. Res. 41 (2011) 113-122. doi:10.1016/j.cemconres.2010.09.013. The (partial) persistence of the basal reflections of illite in the XRD patterns of FC865 and FC905 can be interpreted along similar lines and therefore assigned to dehydroxylated illite.

The main weight loss event in the TGs is assigned to decarbonation of calcite. Based on the weight loss over the decarbonation interval the calcite content in the samples can be calculated. The obtained values of 3-4 wt. % calcite correspond well with the XRD results.

Figure 10:
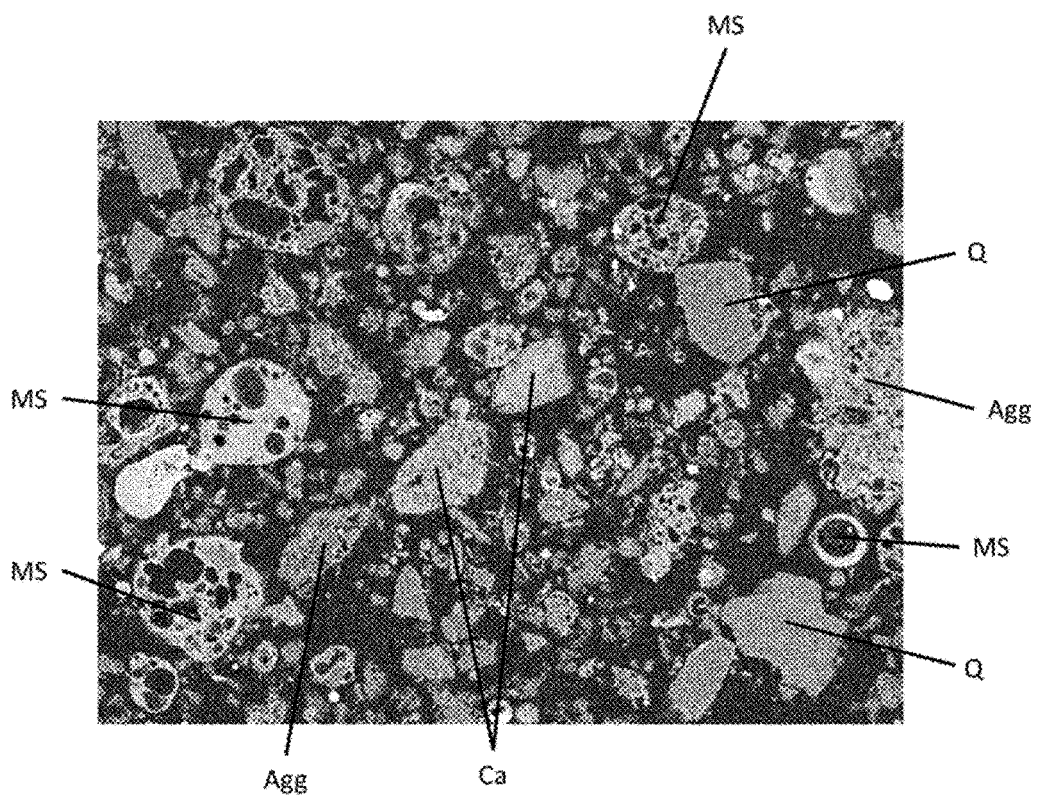
FIG. 10 shows a Backscattered electron (BSE) microscopy image of a polished section of a resin-embedded SCM formed by flash calcination of dried filter cake precursor which was calcined in a flash calciner at 865° C. (material temperature).

Backscattered electron (BSE) microscopy of a polished section of FC865 was used to have a closer look at the distribution and composition of the amorphous phase in the material. A representative BSE image of FC865 is shown in FIG. 10. The polished section now shows cross-sections of both the aggregates and the spheres observed in FIG. 7.

The spheres are hollow or show many irregular smaller cavities, as gas formation within (partially) molten droplets results in inflation and formation of hollow spheres.

The aggregates are constituted by many smaller particles and do not show signs of melt formation. Here water release from the clay minerals did not result in inflation.

Next to aggregates and spheres also larger, angular and compositionally heterogeneous particles can be observed. These correspond to quartz and feldspar grains.

Figure 11:
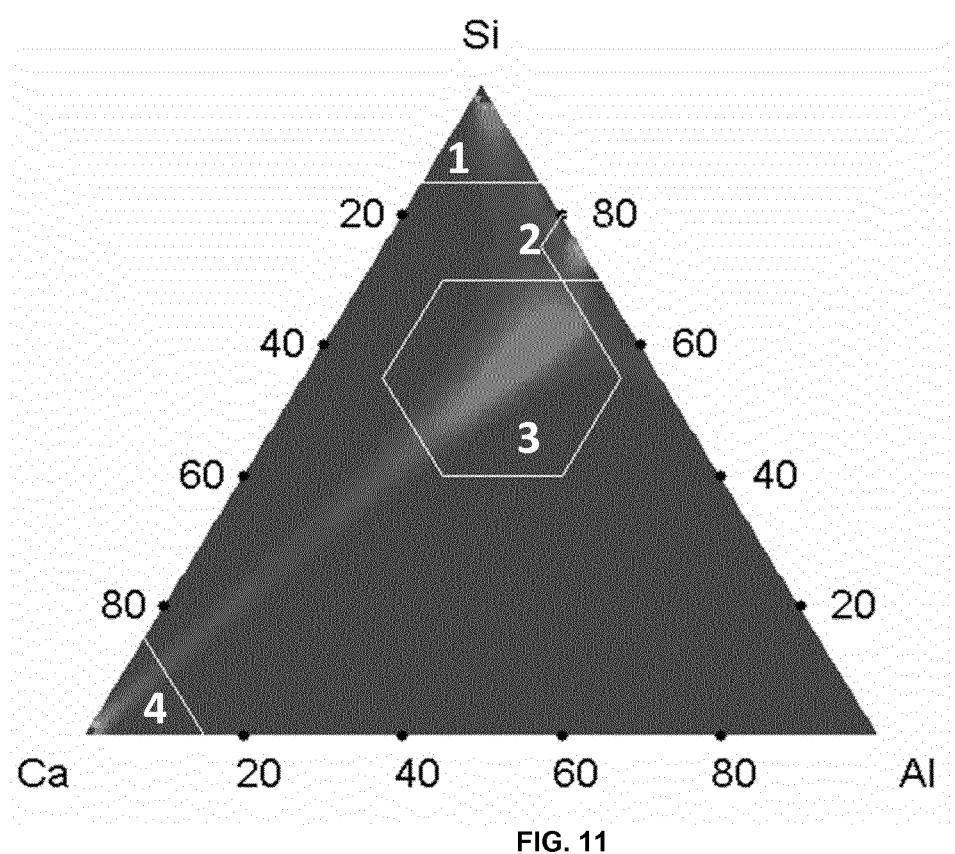
FIG. 11 shows a ternary phase diagram of an SCM basted on a dried filter cake precursor which was flash calcined at 865° C. (material temperature).

In a next step, element mappings of 8 image frames were collected. The element mappings contain the chemical composition of each pixel of the image frame. The composition of all pixels were subsequently plotted in a Ca—Al—Si ternary diagram. Next, a frequency count, i.e. a count of the number of pixels that share the same position in the ternary diagram, was performed. FIG. 11 shows Energy-dispersive X-ray spectroscopy (EDS) results and shows the obtained frequencies in a ternary diagram.

FIG. 11 can be used to identify and define different populations of particles of similar composition. In case of the analyzed FC865 sample 4 different populations can be distinguished. A first group (1) is Si rich and is centered around the Si apex. It can be assigned to quartz grains. A second group (2) is Al—Si rich and is situated around Ca:Al:Si 0:25:75. Having an Al:Si ratio of 1:3 and no Ca, this corresponds to alkali feldspar grains. A third group (3) is Ca—Al—Si mixed, and has a more spread composition around a Ca:Al:Si ratio of 14:24:62. This group is assigned to reactive Ca-aluminosilicates formed during calcination of the clay minerals in the filter cake. Finally, a fourth group (4) is found at the Ca apex and can be assigned to Ca-rich phases such as calcite, free lime and anhydrite. Groups 3 and 4 are faintly connected. This indicates fine intermixing of both groups at a scale smaller than 1-2 µm, the typical resolution of EDS element mappings.

Figure 12:
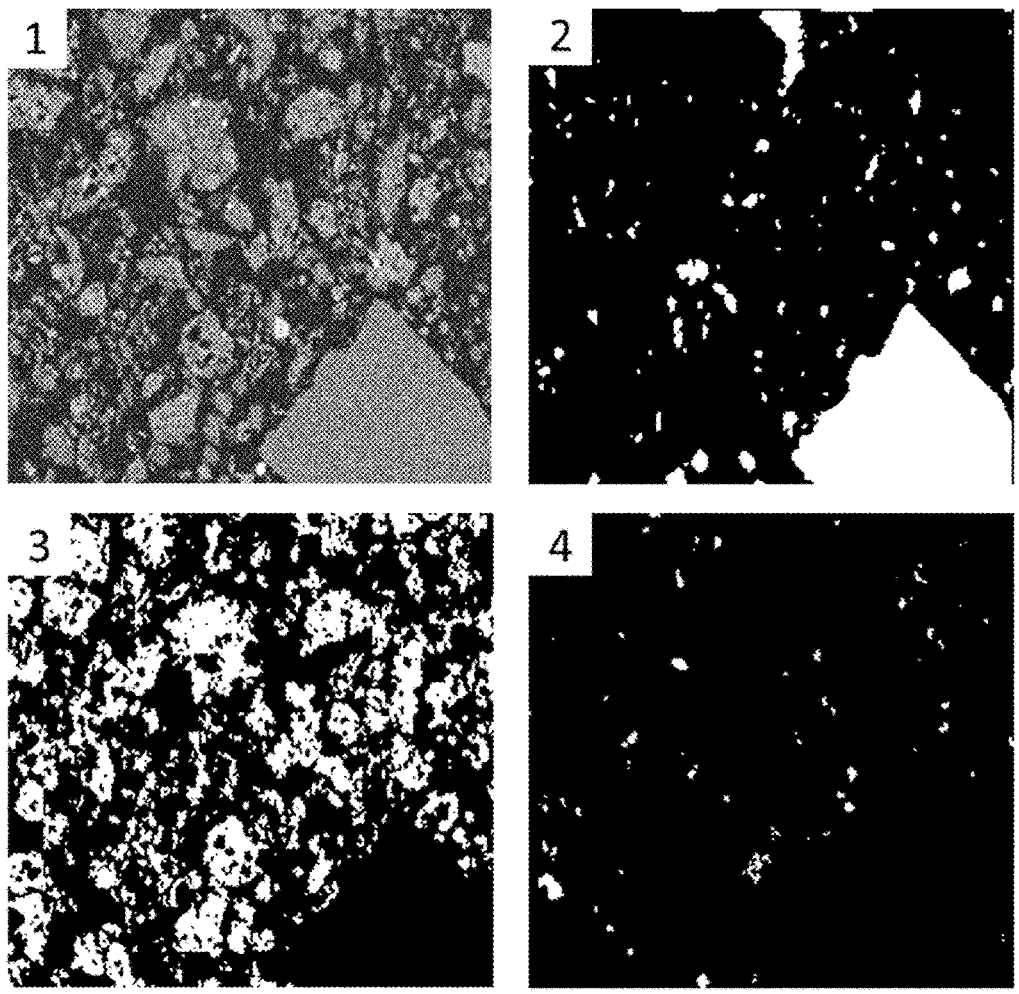
FIG. 12 shows a backscattered electron micrograph (panel 1), and segmented element mappings (panels 2-4) showing the distribution of the defined compositional classes/phases of an SCM basted on a dried filter cake precursor which was flash calcined at 865° C. (material temperature).

In a next step, compositional ranges are defined to segment the element mappings into different classes or phases. First, compositional ranges are defined as hexagons around a center point on the ternary diagram. Next, all pixels in the element mappings are labeled according to whether they fall within a defined compositional class. Finally, the now segmented element mapping shows the distribution of the defined compositional classes/phases (i.e. quartz, feldspars, Ca-aluminosilicates and Ca-rich phases). The different steps of this routine are illustrated in FIG. 12. The particles in the BSE image are subdivided into groups (feldspar group not shown). In particular, panel 1 of FIG. 12 shows a backscattered electron image, panel 2 shows the silica-rich phases (quartz) only, panel 3 shows the Ca-aluminosilicate phase (activated clays) only, and panel 4 shows Ca-rich phases (calcite, anhydrite, free lime) only. From FIG. 12, it is clear that the bulk of the material is composed of the Ca-aluminosilicate group. The particles of this group have a rather irregular appearance, from aggregates to porous spheres of sizes ranging between 5 to 80 µm. Quartz is present as well defined, angular, homogeneous particles of sizes up to 80-100 µm. Feldspar particles are typically smaller and may also be part of larger aggregates. Ca-rich grains mostly appear as isolated well-defined particles.

The chemical composition of the Ca-aluminosilicate phase does not overlap with composition of the initial clay phases. Illite, smectite and kaolinite all contain very low levels of Ca (0-5 wt. %). The incorporation of Ca into the activated phase is very clear from FIG. 11. Ca plays an important role in formation of the melt phase as a network modifier. Melt phase particles (spheres) have not been found in clays calcined following conventional methods (rotary kiln, fluidized bed) and therefore clearly differentiate flash-calcined products from batch calcined clays. A point-counting analysis shows that the flash-calcined filter cakes contain a significant fraction of melt particles (32% of total, 44% of group 3) for the material flash-calcined at 865° C. The formation of spherical particles can be explained by particle melting near to the flame of the flash calciner, the presence of finely dispersed Ca within the clay matrix enhances melt formation by acting as a flux that lowers melting temperatures. In other words, the presence of calcite has a fluxing effect, it facilitates the decomposition of the clay minerals and enhances the formation of melt droplets. These melt droplets are rapidly quenched and as result a Ca-rich aluminosilicate glass forms.

The presence of calcite in the calcined filter cakes is beneficial for their use as an SCM. In particular, calcite is known to have a positive influence on the hydration of blended cements rich in $Al_2O_3$. Reaction of the carbonate with regular AFm-monosulfate leads to the formation of hemi- and monocarbonate phases and indirectly results in the formation of larger amounts of ettringite which is beneficial in terms of the space filling and strength development, as reported in B. Lothenbach, G. Le Saout, E. Gallucci, K. Scrivener, Influence of limestone on the hydration of Portland cements, Cem. Concr. Res. 38 (2008) 848-860. doi:10.1016/j.cemconres.2008.01.002; K. De Weerdt, M. Ben Haha, G. Le Saout, K. O. Kjellsen, H. Justnes, B. Lothenbach, Hydration mechanisms of ternary Portland cements containing limestone powder and fly ash, Cem. Concr. Res. 41 (2011) 279-291. doi:10.1016/j.cemconres.2010.11.014; and M. Antoni, J. Rossen, F. Martirena, K. Scrivener, Cement substitution by a combination of metakaolin and limestone, Cem. Concr. Res. 42 (2012) 1579-1589. doi:10.1016/j.cemconres.2012.09.006.

Anhydrite ($CaSO_4$) is used in cements to regulate setting and optimize early strength gain of the cement. In case Al-rich SCMs are used, calcium sulfates are typically added to increase early age strengths as reported in M. Antoni, J. Rossen, F. Martirena, K. Scrivener, Cement substitution by a combination of metakaolin and limestone, Cem. Concr. Res. 42 (2012) 1579-1589. doi:10.1016/j.cemconres.2012.09.006. Therefore, the presence of anhydrite in the calcined filter cakes can in fact be beneficial.

The invention claimed is:

1. A method for producing a supplementary cementitious material (SCM) comprising:
   a) providing dredged sludge comprising at least 50 wt.% to at most 90 wt.% water, at least 0 to at most 60 wt.% dry matter-based (DM) coarse fraction, and at least 40 wt.% DM fine fraction;
   b) removing the sand fraction from the dredged sludge, thereby retaining the fine fraction of the dredged sludge, the fine fraction comprises less than 30 wt.% grains having a grain size larger than 63 μm;

c) adding of portlandite (slaked lime, Ca(OH)$_2$), or quicklime (CaO) to the fine fraction;

d) dewatering of the fine fraction, thereby forming dried filter cake precursor; and, e) thermally treating the dried filter cake precursor.

2. The method according to claim 1 wherein step e) involves calcination of the dried filter cake precursor.

3. The method according to claim 1 wherein step e) involves flash calcination of the dried filter cake precursor.

4. The method according to claim 3 wherein flash calcination involves heating the dried filter cake precursor for at least 0.10s to at most 10s at a temperature of at least 800° C. to at most 1100° C.

5. The method according to claim 1 wherein step e) involves heating the dried filter cake precursor in a rotary kiln; to a temperature between at least 550° C. and at most 850° C. for at least 20 minutes to at most 3 hours.

6. The method according to claim 1 wherein the dried filter cake precursor comprises at least 40 to at most 99 wt.% DM hydrous aluminosilicates and at least 1 to at most 15 wt.% DM calcium (alumino-)silicate hydrates; wherein the calcium (alumino-) silicate hydrates are products of the pozzolanic reaction between Ca(OH)2 and the fine fraction of the dredged sludge.

7. The method according to claim 1 wherein step c) involves adding portlandite (Ca(OH)$_2$) to the fine fraction of the dredged sediments in a quantity of 2 to 10 wt.% DM, or wherein step c) involves adding quicklime (CaO) in a quantity of 2 to 7 wt.% DM.

8. The method according to claim 1 wherein the fine fraction comprises less than 60 wt.% physisorbed water.

9. The method according to claim 1 wherein step d) involves mechanically dewatering the fine fraction.

10. The method according to claim 1 wherein the fine fraction comprises less than 10 wt. % grains having a grain size larger than 63 μm.

11. The method according to claim 5 wherein the dried filter cake precursor is heated to a temperature between at least 650° C. and at most 750° C.

* * * * *